(12) United States Patent
Wang

(10) Patent No.: US 11,338,766 B2
(45) Date of Patent: May 24, 2022

(54) WEBBING LENGTH ADJUSTMENT DEVICE

(71) Applicant: Liang-Hsiung Wang, Tainan (TW)

(72) Inventor: Liang-Hsiung Wang, Tainan (TW)

( * ) Notice: Subject to any disclaimer, the term of this patent is extended or adjusted under 35 U.S.C. 154(b) by 112 days.

(21) Appl. No.: 16/801,030

(22) Filed: Feb. 25, 2020

(65) Prior Publication Data

US 2020/0290557 A1    Sep. 17, 2020

(30) Foreign Application Priority Data

Mar. 14, 2019    (TW) .................................. 108108636

(51) Int. Cl.
*B60R 22/20* (2006.01)
*B60R 22/12* (2006.01)
*B60R 22/30* (2006.01)
*A44B 11/25* (2006.01)

(52) U.S. Cl.
CPC ........ *B60R 22/201* (2013.01); *A44B 11/2557* (2013.01); *B60R 22/12* (2013.01); *B60R 22/30* (2013.01)

(58) Field of Classification Search
CPC .. A44B 11/2557; B60R 22/30; Y10T 24/4084
See application file for complete search history.

(56) References Cited

U.S. PATENT DOCUMENTS

| | | | | |
|---|---|---|---|---|
| 3,293,713 A | * | 12/1966 | Gaylord | A44B 11/10 24/196 |
| 3,414,947 A | * | 12/1968 | Holmberg | A44B 11/2557 24/196 |
| 3,591,900 A | * | 7/1971 | Brown | A44B 11/10 24/196 |
| 3,999,254 A | * | 12/1976 | McLennan | A44B 11/10 24/196 |
| 4,131,976 A | | 1/1979 | Bengtsson | |
| 4,962,572 A | * | 10/1990 | Prentkowski | A44B 11/2557 24/196 |
| 5,331,726 A | | 7/1994 | Suh | |
| 5,471,714 A | | 12/1995 | Olson | |

(Continued)

FOREIGN PATENT DOCUMENTS

| | | |
|---|---|---|
| CN | 104417485 A | 3/2015 |
| CN | 204415321 U | 6/2015 |
| DE | 202008006576 U1 | 8/2008 |

(Continued)

*Primary Examiner* — Robert Sandy
(74) *Attorney, Agent, or Firm* — Sinorica LLC

(57) ABSTRACT

A webbing length adjustment device has an outer shell, an adjustment assembly, and an elastic member. The adjustment assembly is disposed in and is moveable relative to the outer shell, and has an operating member having a lateral pressing plate portion and a sliding member moving relative to the operating member. The lateral pressing plate portion is formed on the operating member, is located above the outer shell, and is located beside the second through hole for giving more areas to exert force easily and operate conveniently. The lateral pressing plate portion is located at an outer side of a first webbing. There is no interference between the first webbing and user's hand. The elastic member is disposed in the outer shell, and is connected to the outer shell and the operating member for giving a restoring force to the operating member. The outer shell is hard to damage.

27 Claims, 19 Drawing Sheets

(56) References Cited

U.S. PATENT DOCUMENTS

2003/0188400 A1   10/2003   Turner
2018/0222439 A1    8/2018   Eaton

FOREIGN PATENT DOCUMENTS

| EP | 0532032 A1 | 3/1993 |
|----|------------|--------|
| KR | 10-2019-0012290 A | 2/2019 |
| TW | M338786 | 8/2008 |
| TW | I640444 | 2/2019 |

\* cited by examiner

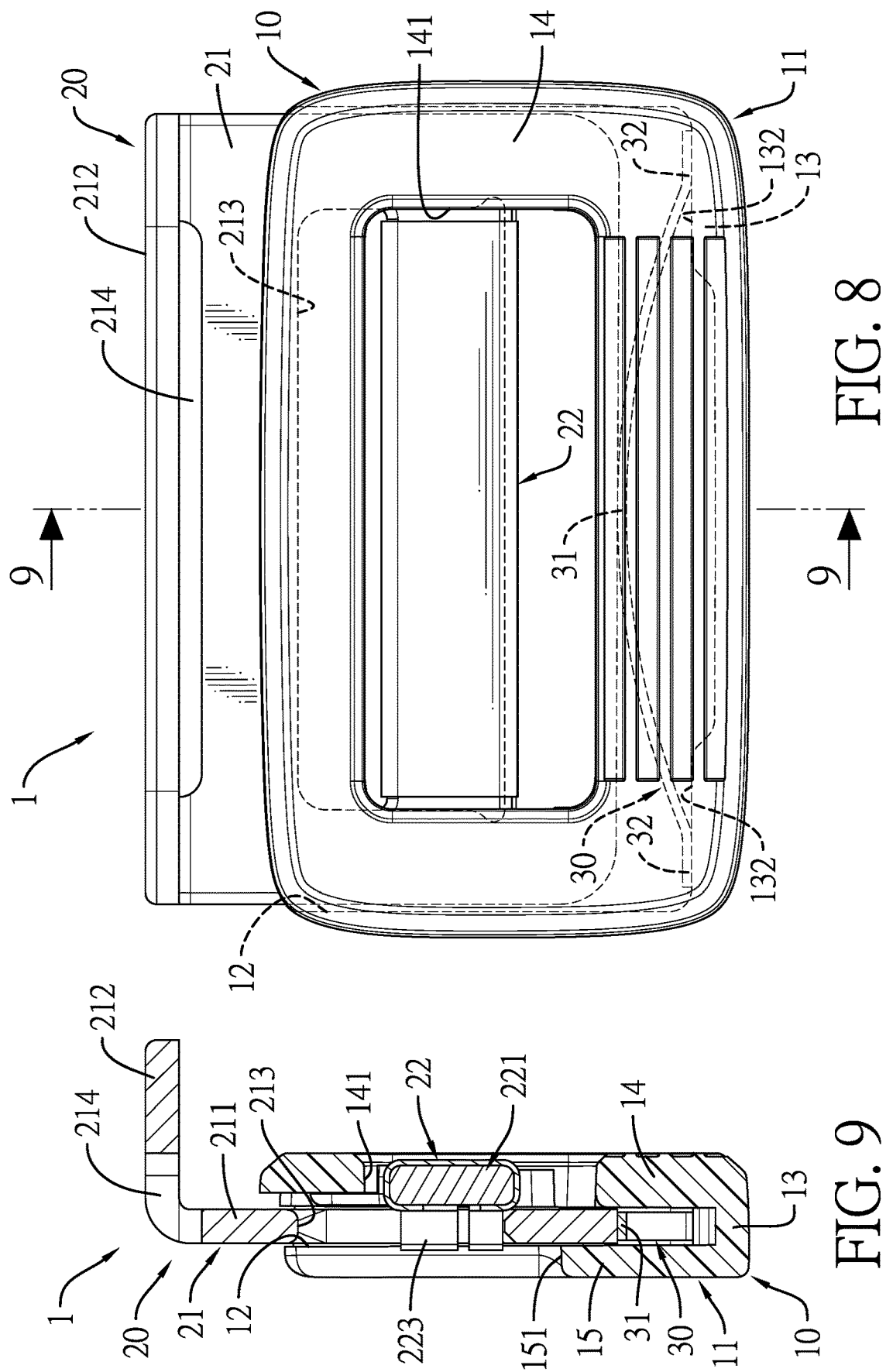

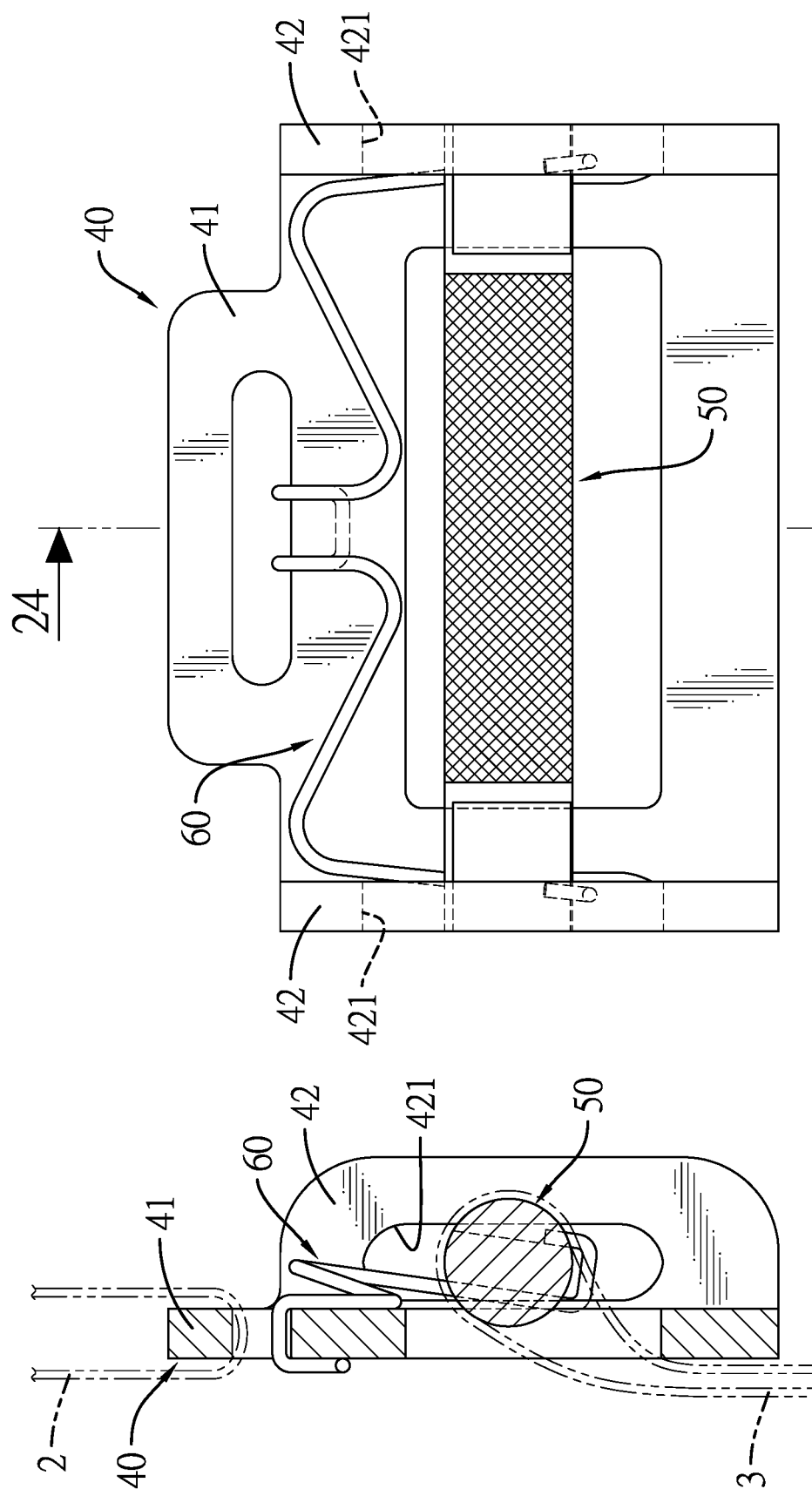

WEBBING LENGTH ADJUSTMENT DEVICE

This application claims the benefit of Taiwan patent application No. 108108636, filed on Mar. 14, 2019.

BACKGROUND OF THE INVENTION

1. Field of the Invention

The present invention relates to a webbing length adjustment device, and more particularly to a webbing length adjustment device that can be applied to a webbing of a seat belt system or a webbing of a tightening mechanism for adjusting a webbing length conveniently.

2. Description of Related Art

Ensuring safety of every occupant sitting in a vehicle, on a wheelchair, or in a moving carrier, each seat disposed in the vehicle, the wheelchair, or the moving carrier has a seat belt system. The seat belt system has a retractor, a webbing connected to the retractor, and a buckling device. The buckling device is connected to the webbing and is able to selectively buckle. A conventional webbing length adjustment device is disposed on the webbing to restrain the occupants of different body shapes. Moreover, a tightening mechanism having the webbing has the conventional webbing length adjustment device for having an adjustment function in the webbing length. The conventional webbing length adjustment device is disposed on the webbing to restrain the occupants of different body shapes.

There are many kinds of the conventional webbing length adjustment devices. The common conventional webbing length adjustment devices are described as follows.

With reference to FIGS. 21 and 22, a first conventional webbing length adjustment device has an adjustment base 40 and a moving element 50. The adjustment base 40 and the moving element 50 are rigid members and are made of metallic materials. The adjustment base 40 has a back plate 41 and two side plates 42. The two side plates 42 are formed on two sides of the back plate 41 and are extended toward each other. Each one of the two side plates 42 has an elongated hole 421 being inclined. The moving element 50 is moveably disposed between the two side plates 42 of the adjustment base 40. Two ends of the moving element 50 are inserted into the elongated hole 421.

The first conventional webbing length adjustment device is applied to a seat belt system. A first webbing 2 is connected to the adjustment base 40. A second webbing 3 is passed between the adjustment base 40 and the moving element 50 and can be clipped to fix. The first conventional webbing length adjustment device lacks an elastic structure. The moving element 50 cannot be restored. In the process for adjusting the webbing length, the second webbing 3 released or clipped is manually operated by a user. The operation of the first conventional webbing length adjustment device is inconvenient.

Furthermore, the adjustment base 40 is formed by a bent metal plate. Areas of a top end and a bottom end of the adjustment base 40 held by the user are small. A portion of the top end of the adjustment base 40 wound by the first webbing 2 is located at an inner side of the first webbing 2. It is hard to provide point of application to the user. The operation of the first conventional webbing length adjustment device is inconvenient. In addition, the adjustment base 40 and the moving element 50 are the rigid members, are made of metallic materials, and are applied to the seat belt system. The adjustment base 40 and the moving element 50 can directly contact a body of the user, generating an uncomfortable feel.

With reference to FIGS. 23 and 24, a structure of a second conventional webbing length adjustment device is based on the combination of the adjustment base 40 and the moving element 50 of the first conventional webbing length adjustment device, and further has an elastic element 60. The elastic element 60 is connected between the adjustment base 40 and the moving element 50 for giving a restoring force to the moving element 50. When the second conventional webbing length adjustment device is released, the elastic element 60 pushes the moving element 50, and the moving element 50 is restored to clip the second webbing 3 automatically for improving the operation problem in the first conventional webbing length adjustment device.

However, in the second conventional webbing length adjustment device, the adjustment base 40 is still formed by the bent metal plate. Areas of the top end and the bottom end of the adjustment base 40 held by the user are small. The portion of the top end of the adjustment base 40 wound by the first webbing 2 is located at an inner side of the first webbing 2. It is hard to give point of application to the user. The operation of the second conventional webbing length adjustment device is inconvenient. In addition, the adjustment base 40 and the moving element 50 are the rigid members, are made of metallic materials, and are applied to the seat belt system. The adjustment base 40 and the moving element 50 can directly contact the body of the user, generating the uncomfortable feel.

With reference to FIGS. 25 and 26, a third conventional webbing length adjustment device has a plastic shell 70, an operating plate 80, and a moving plate 90. The operating plate 80 and the moving plate 90 are disposed in the plastic shell 70 and can move relative to each other. When the third conventional webbing length adjustment device is applied to the seat belt system, the first webbing 2 is connected to the operating plate 80. The second webbing 3 passes through the plastic shell 70 and is wound on the operating plate 80 and the moving plate 90. The operating plate 80 and the moving plate 90 are clipped to fix the second webbing 3. The plastic shell 70 has two elongated elements 71, 71'. The two elongated elements 71, 71' are laterally disposed in the plastic shell 70 and are opposite to each other. The two elongated elements 71, 71' are respectively inserted into two through holes 81 of the operating plate 80. When operating plate 80 is pressed toward the plastic shell 70, the two elongated elements 71, 71' are bent to generate an elastic deformation. When the force applied on the operating plate 80 is released, the operating plate 80 is moved upwardly by the resilience generated by the two elongated elements 71, 71' to restore.

In the third conventional webbing length adjustment device, the plastic shell 70 is disposed around the operating plate 80 and the moving plate 90. In use, the plastic shell 70 can directly contact the body of the user for decreasing the uncomfortable feel. In the third conventional webbing length adjustment device, the operating plate 80 can be restored by the resilience generated by the two elongated elements 71, 71' in the plastic shell 70.

However, the two elongated elements 71, 71' are slender. In use, it is easy to break the two elongated elements 71, 71' and lose the function to restore the operating plate 80. Furthermore, in use, the user shall hold the plastic shell 70 and press a top end of the operating plate 80. An area of the operating plate 80 held by the user is small. The portions of the top end of the operating plate 80 and a top end of the plastic shell 70 wound by the first webbing 2 are located at the inner side of the first webbing 2. It is hard to give point of application to the user. The operation of the third conventional webbing height adjustment device is inconvenient.

In view of the first, second, and third conventional webbing length adjustment devices, the above-mentioned conventional webbing length adjustment devices have the disadvantages of small holding areas and inconvenient operation. The third conventional webbing length adjustment device has the plastic shell 70 for decreasing the uncomfortable feel, but the two elongated elements 71, 71' of the plastic shell 70 tend to be broken easily. Improvement is indeed needed.

To overcome the shortcomings, the present invention provides a webbing length adjustment device to mitigate or obviate the aforementioned problems.

SUMMARY OF THE INVENTION

The objective of the invention is to provide a webbing length adjustment device that can solve the problems that the operation is inconvenient, the device lacks points of application, and the plastic shell is easy to break.

The webbing length adjustment device is applied to be connected to a first webbing and a second webbing of a seat belt system, and has an outer shell, an adjustment assembly, and an elastic member.

The outer shell has a wall and a longitudinal groove. The wall has a first side plate, a second side plate, and a bottom plate. The first side plate has a first connecting hole formed through the first side plate. The second side plate is laterally opposite to the first side plate at a spaced interval and has a second connecting hole formed through the second side plate. The bottom plate is disposed between and is connected with the first side plate and the second side plate. The longitudinal groove is formed in the wall, is located between the first side plate and the second side plate, is located above the bottom plate, communicates with the first connecting hole of the first side plate and the second connecting hole of the second side plate, and has at least one upward opening formed on the wall.

The adjustment assembly is disposed in the outer shell and has an operating member and a sliding member. The operating member is moveably disposed in the longitudinal groove of the outer shell and has a first through hole, a second through hole, and a lateral pressing plate portion. The first through hole is formed through the operating member and is located in the longitudinal groove of the outer shell. The second through hole is formed through the operating member and is located above the first through hole. The first webbing is inserted through the first through hole and the second through hole of the operating member for being connected to the operating member The lateral pressing plate portion is formed on the operating member, is located above the outer shell, and is located beside the second through hole. The lateral pressing plate portion is located at an outer side of the first webbing. The sliding member is disposed in the first through hole of the operating member. The operating member and the sliding member are disposed in the outer shell and are moveable relative to each other. The second webbing passes through the first through hole of the operating member from an outer side of the outer shell, curls around the sliding member and returns from the first through hole, and passes out the outer shell. The second webbing is locked or unlocked by a relative motion between the operating member and the sliding member.

The elastic member is disposed in the longitudinal groove of the outer shell and is located between the bottom plate and the operating member.

The webbing length adjustment device can be applied to a webbing of the seat belt system or a webbing of a tightening mechanism. The operating member is connected to the first webbing. The operating member disposed in the outer shell is connected to the second webbing by the sliding member for adjusting the length of the second webbing. The webbing length adjustment device in accordance with the present invention has the following advantages.

1. Easy to Apply Force on the Points of Application and Operating Conveniently:

The operating member is disposed in the outer shell. The lateral pressing plate portion is formed on a top end of the operating member and is bent laterally and is located outside the outer shell. In use, the lateral pressing plate portion of the operating member and a bottom portion of the outer shell can be held and pressed by a hand of a user for loosening the second webbing. The lateral pressing plate portion of the operating member gives more areas for gripping and gives the points of application for pressing easily and operating conveniently.

2. Eliminate the Interference in Operation:

As described, the lateral pressing plate portion of the operating member is located beside the second through hole. When the operating member is connected to the first webbing of the seat belt system, the lateral pressing plate portion is located at an outer side of the first webbing and gives good points of application for pressing easily. The lateral pressing plate portion of the operating member is pressed by the user and moves relative to the outer shell. There is no interference between the first webbing and user's hand when the user operates the webbing length adjustment device.

3. The Outer Shell is Hard to Damage:

The webbing length adjustment device provides the outer shell for disposing, protecting, and gripping the adjustment assembly. The elastic member is an independent member and is disposed in the outer shell for giving a restoring force to the operating member of the adjustment assembly. The outer shell is an integrated element. Therefore, the outer shell is hard to damage.

In the webbing length adjustment device, the sliding member further has a covering body. The covering body is made of a bent metal slice or any rigid material, and is wound around and is fixed on the base plate portion of the sliding plate. The covering body has two side ends, and two sliding connecting portions are respectively formed on the two side ends of the covering body. The sliding plate can be located at a side of the longitudinal plate portion of the operating member. The two sliding connecting portions of the sliding member are inserted through the first through hole of the operating member. Alternatively, the two sliding connecting portions are two protrusions, are formed on a side surface of the base plate portion, and are inserted into the first through hole of the operating member. The operating member can move relative to the sliding member. The sliding member is easy to manufacture and the manufacturing cost is lower.

In the webbing length adjustment device, the wall has a lateral protrusion. The lateral protrusion is formed on a bottom end of the outer shell and is located below the lateral pressing plate portion. The lateral protrusion formed on the bottom end of the outer shell gives more areas for gripping and gives the points of application for pressing easily and operating conveniently.

Other objectives, advantages and novel features of the invention will become more apparent from the following detailed description when taken in conjunction with the accompanying drawings.

BRIEF DESCRIPTION OF THE DRAWINGS

FIG. 8 is a front side view of the webbing length adjustment device in FIG. 1;

FIG. 9 is a cross sectional side view of the webbing length adjustment device along line 8-8 in FIG. 8;

FIG. 23 is a front side view of a second conventional webbing length adjustment device in accordance with the prior art;

FIG. 24 is an operational side view in partial section of the first conventional webbing length adjustment device along line 24-24 in FIG. 23;

DETAILED DESCRIPTION OF THE PREFERRED EMBODIMENT

Figure 1:
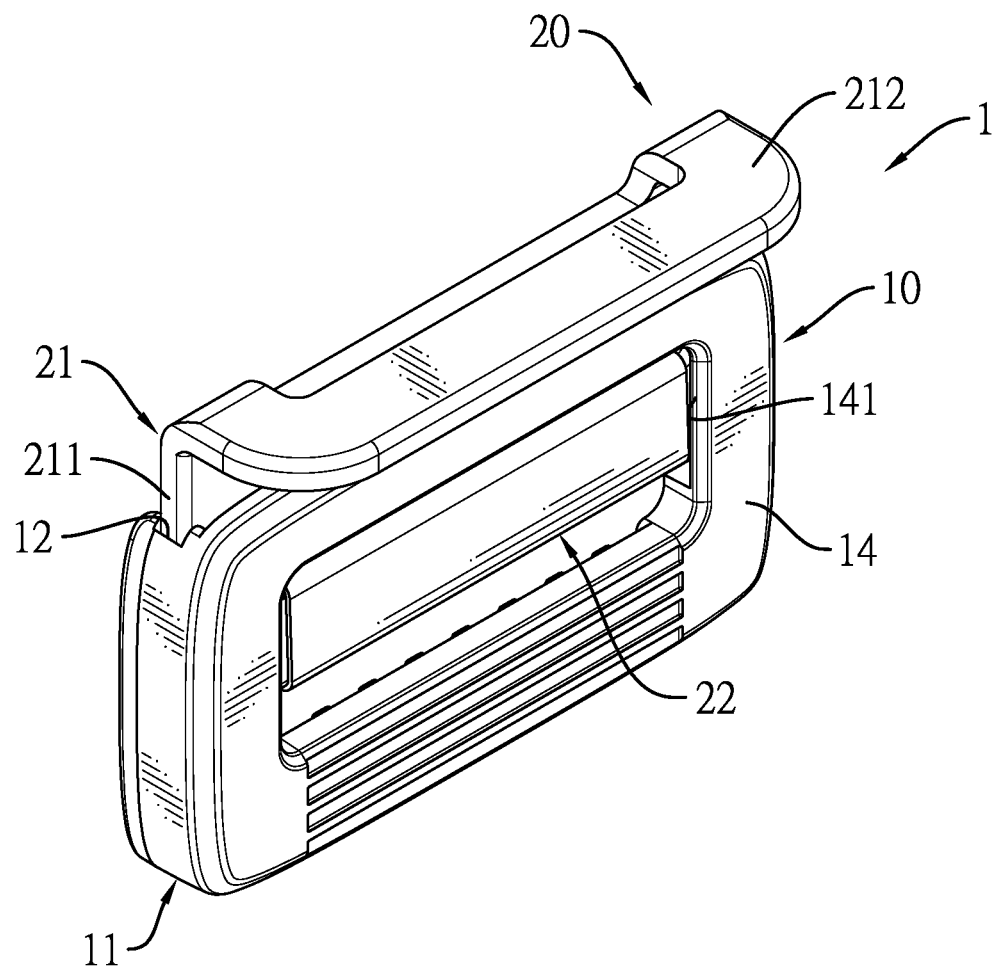
FIG. 1 is a perspective view of a first embodiment of a webbing length adjustment device in accordance with the present invention.
Figure 10:
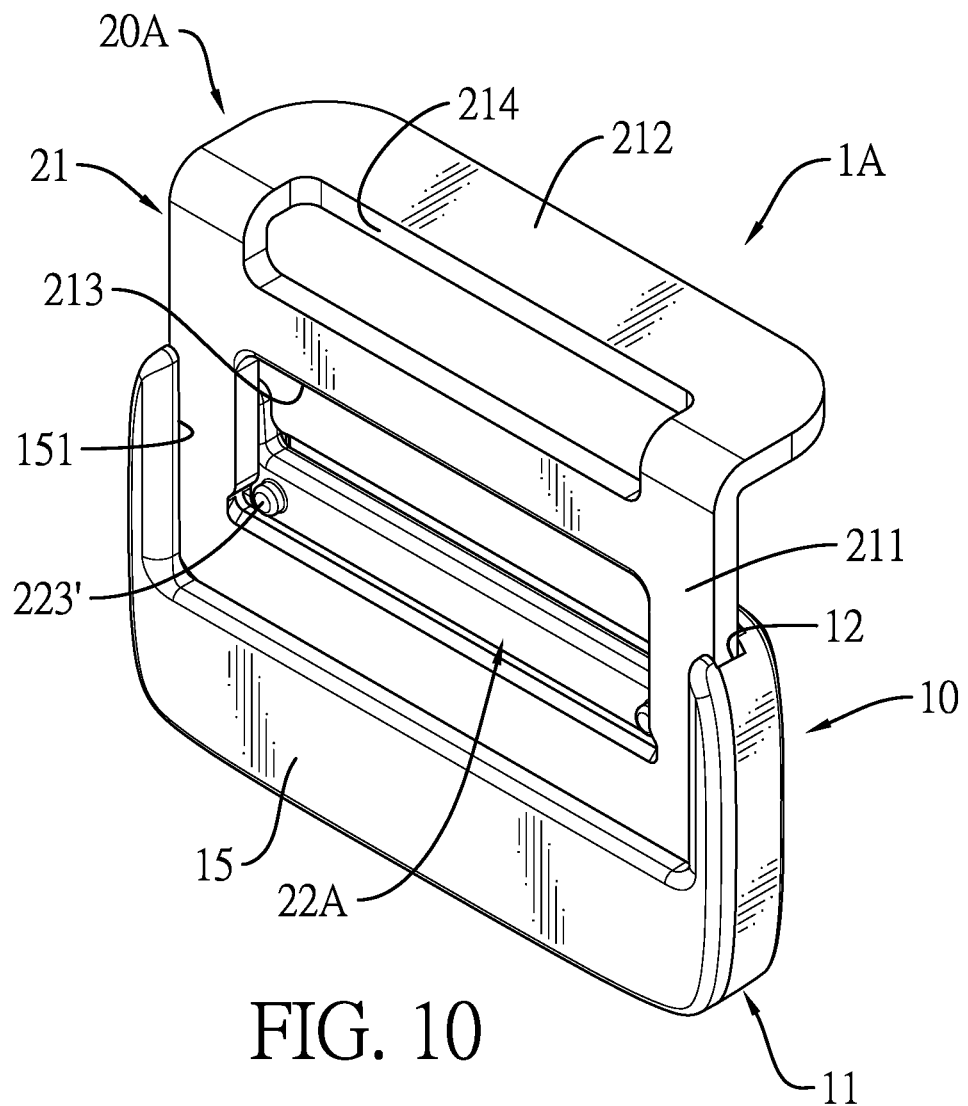
FIG. 10 is a perspective view of a second embodiment of a webbing length adjustment device in accordance with the present invention.
Figure 12:
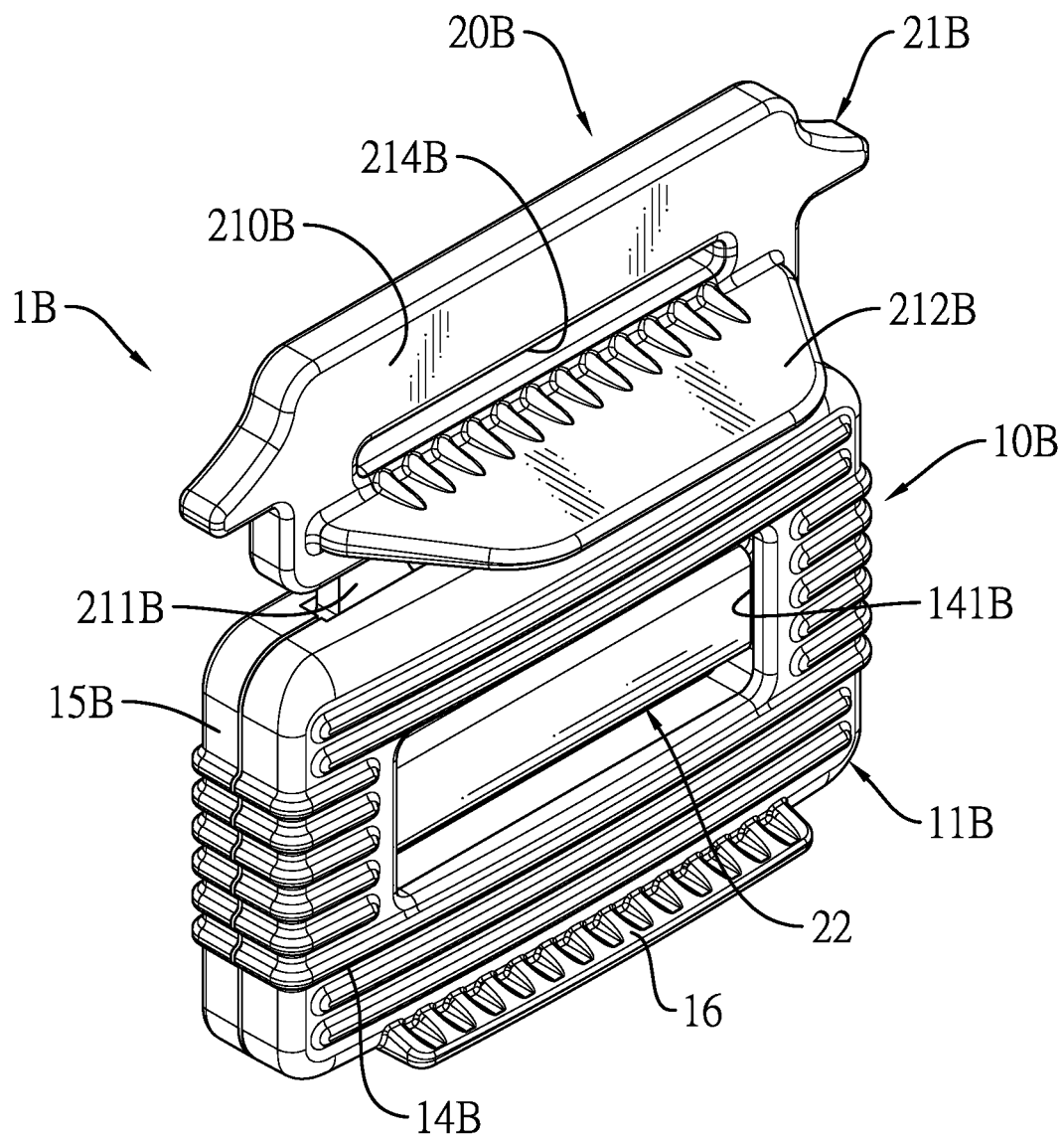
FIG. 12 a perspective view of a third embodiment of a webbing length adjustment device in accordance with the present invention.

With reference to FIGS. 1, 10, and 12, each one of a first embodiment, a second embodiment, and a third embodiment of a webbing length adjustment device 1 in accordance with the present invention comprises an outer shell 10, 10B, an adjustment assembly 20, 20A, 20B, and an elastic member 30.

With reference to FIGS. 1 to 4, 10, 12, and 13, the outer shell 10, 10B has a wall 11, 11B and a longitudinal groove 12, 12B. The wall 11, 11B has a first side plate 14, 14B, a second side plate 15, 15B, and a bottom plate 13, 13B. The first side plate 14, 14B has a first connecting hole 141, 141B formed through the first side plate 14, 14B. The second side plate 15, 15B is laterally opposite to the first side plate 14, 14B at a spaced interval and has a second connecting hole 151, 151B formed through the second side plate 15, 15B. The bottom plate 13, 13B is disposed between and is connected with the first side plate 14, 14B and the second side plate 15, 15B.

The longitudinal groove 12, 12B is formed in the wall 11, 11B, is located between the first side plate 14, 14B and the second side plate 15,15B, is located above the bottom plate 13, 13B, communicates with the first connecting hole 141, 141B of the first side plate 14, 14B and the second connecting hole 151, 151B of the second side plate 15, 15B, and has at least one upward opening 121, 121B formed on the wall 11, 11B. Furthermore, the first side plate 14, 14B has an inner side surface facing the longitudinal groove 12, 12B and two positioning grooves 142, 142B. The two positioning grooves 142, 142B are formed on the inner side surface of the first side plate 14, 14B and are oppositely located beside the first connecting hole 141, 141B.

With reference to FIG. 12, the outer shell 10B has a lateral protrusion 16. The lateral protrusion 16 is formed on a bottom end of the first side plate 14B and extends outwardly and laterally. The lateral protrusion 16 gives more areas to a user for gripping.

With reference to FIGS. 1 to 4, and 10, in the first embodiment and the second embodiment of the webbing length adjustment device 1, 1A, the outer shell 10 has a shell body 101 and a cover 102. The shell body 101 is combined to the cover 102 to form an integrated outer shell 10. The shell body 101 has the first side plate 14. The cover 102 has the second side plate 15. The second connecting hole 151 of the second side plate 15 is formed from a top end of the second side plate 15 and extends longitudinally. The second connecting hole 151 is open upwardly. With reference to FIGS. 4 to 8, in the wall 11 of the outer shell 10, the bottom plate 13 has a concave portion 131 and two receiving portions 132. The concave portion 131 is located at a middle section of the bottom plate 13 and has two side ends. The two receiving portions 132 are respectively formed on the two side ends of the concave portion 131. In addition, with reference to FIG. 5, the outer shell 10 is an integrated element.

Figure 14:
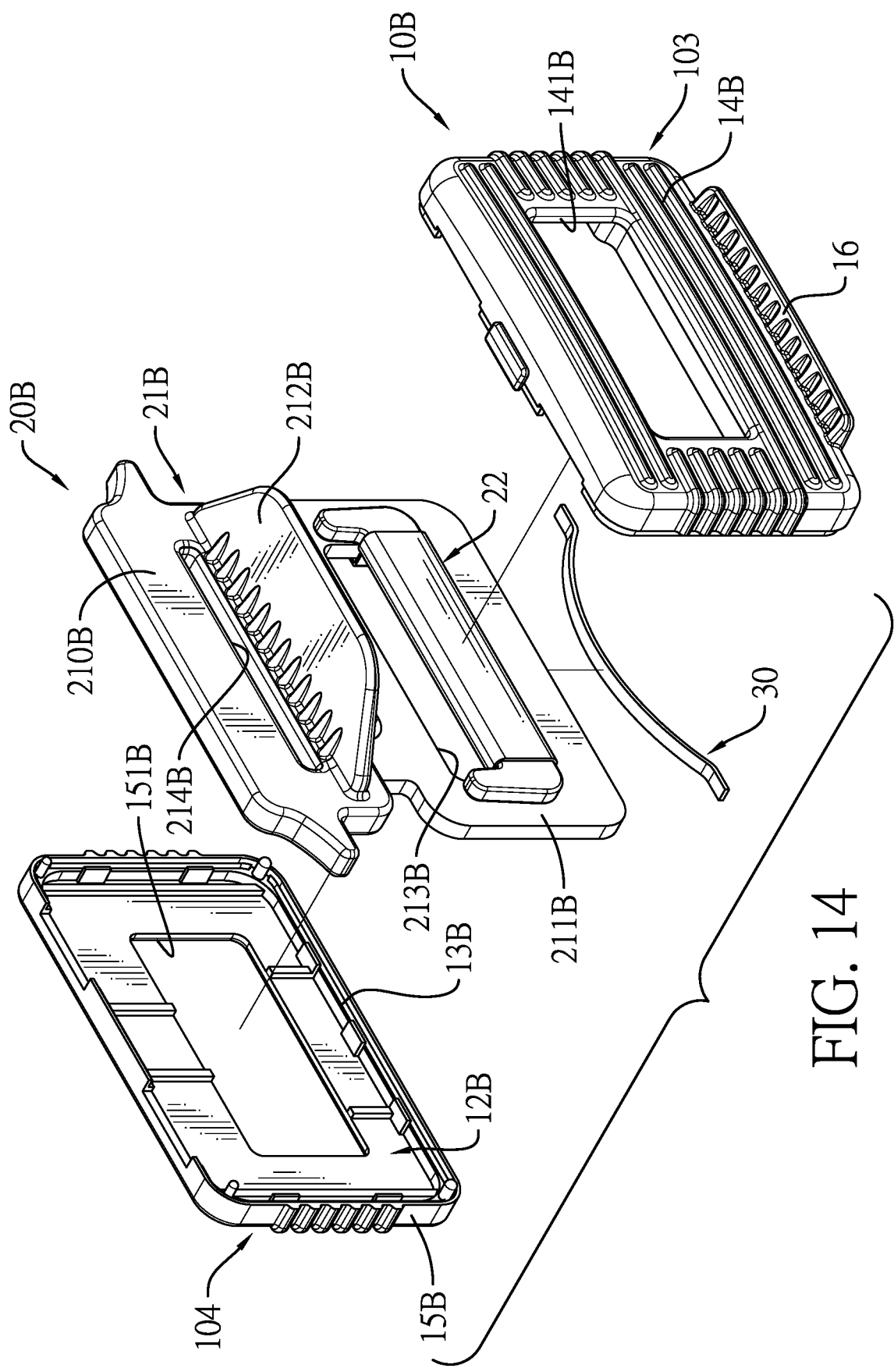
FIG. 14 is an exploded perspective view of the webbing length adjustment device in FIG. 12.
Figure 15:
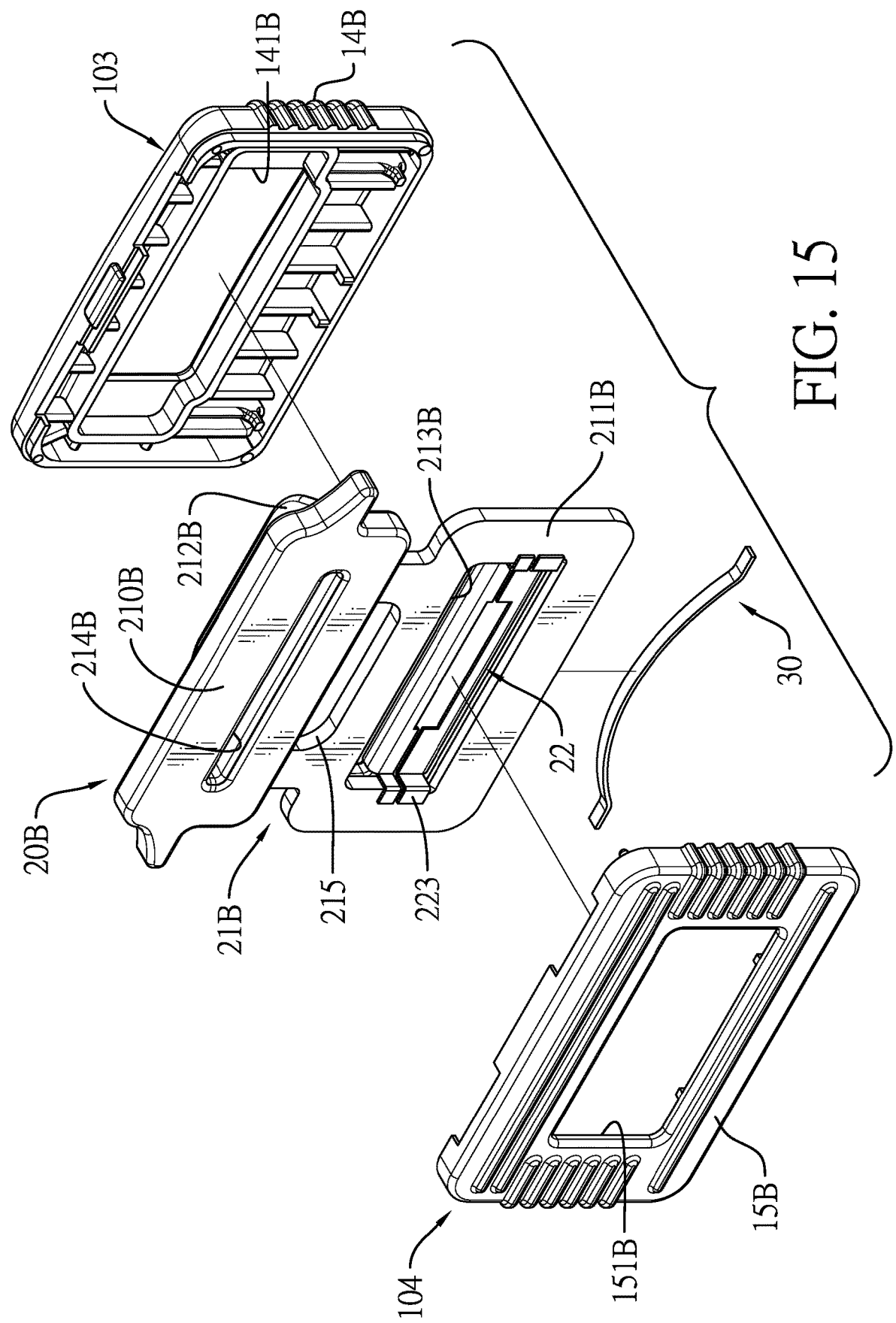
FIG. 15 is another exploded perspective view of the webbing length adjustment device in FIG. 13.
Figure 16:
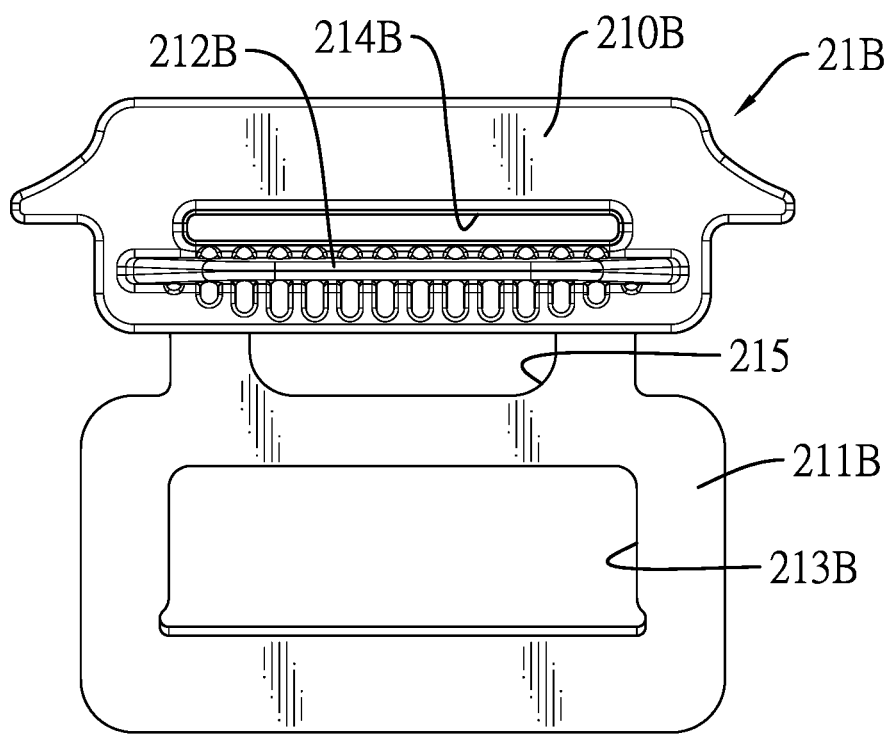
FIG. 16 is a front side view of the webbing length adjustment device in FIGS. 14 and 15.

With reference to FIGS. 14 and 15, in the third embodiment of the webbing length adjustment device 1B, the outer shell 10B has a first semi-shell 103 and a second semi-shell 104, the first semi-shell 103 is fixed with the second semi-shell 104 by means such as high-frequency welding and fastening elements. The first side plate 14B having the first connecting hole 141B is located at the first semi-shell 103. The second side plate 15B having the second connecting hole 151B is located at the second semi-shell 104. The second connecting hole 151B is formed on a middle section of the second side plate 15B.

With reference to FIGS. 9, 10, 18, and 19, the adjustment assembly 20, 20A, 20B is disposed in and is moveable relative to the wall 11 of the outer shell 10, 10B. The adjustment assembly 20, 20A, 20B has an operating member 21, 21B and a sliding member 22, 22A. The sliding member 22, 22A is connected to the operating member 21, 21B and is moveable relative to the operating member 21, 21B.

Figure 4:
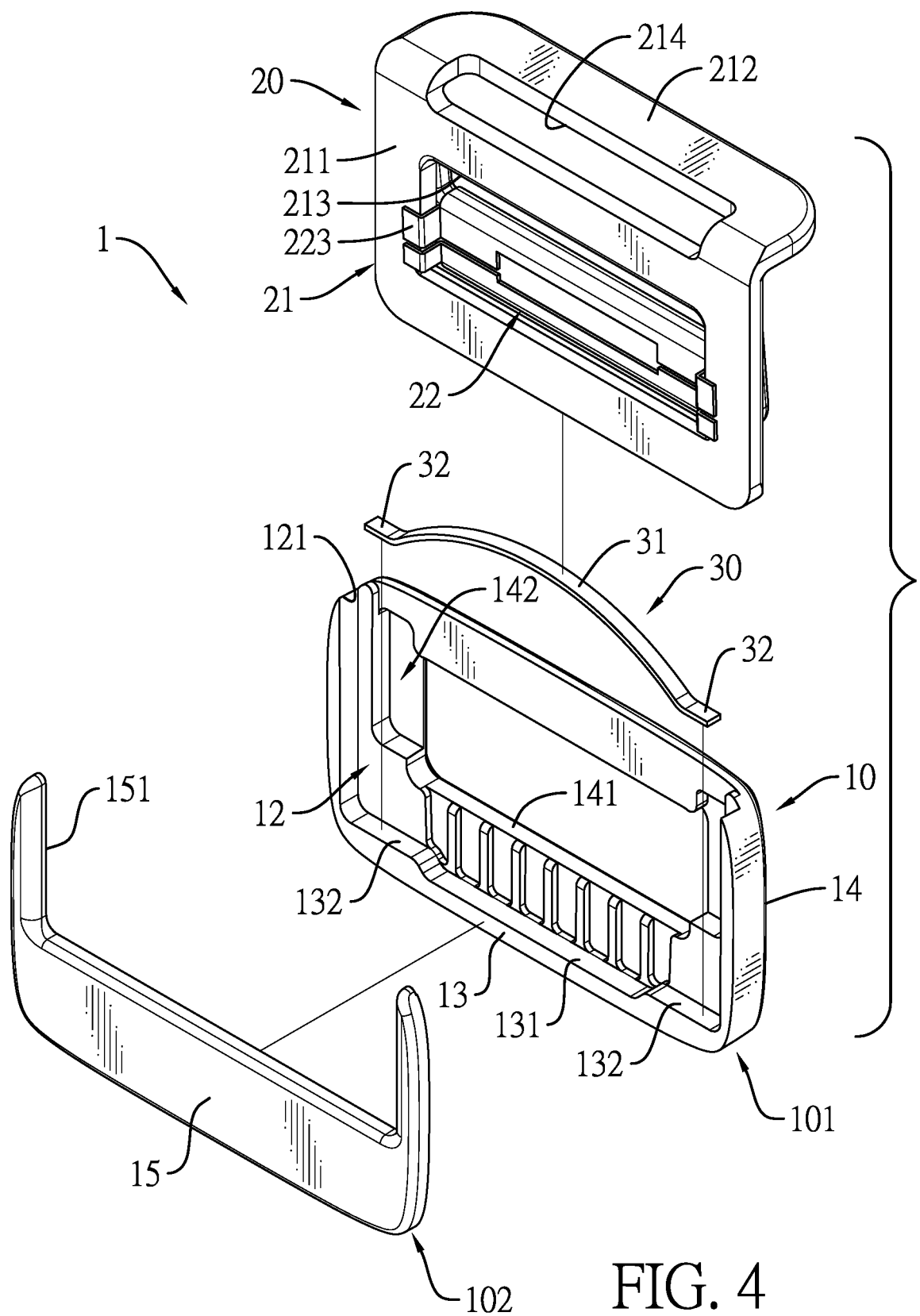
FIG. 4 is another exploded perspective view of the webbing length adjustment device in FIG. 2.
Figure 5:
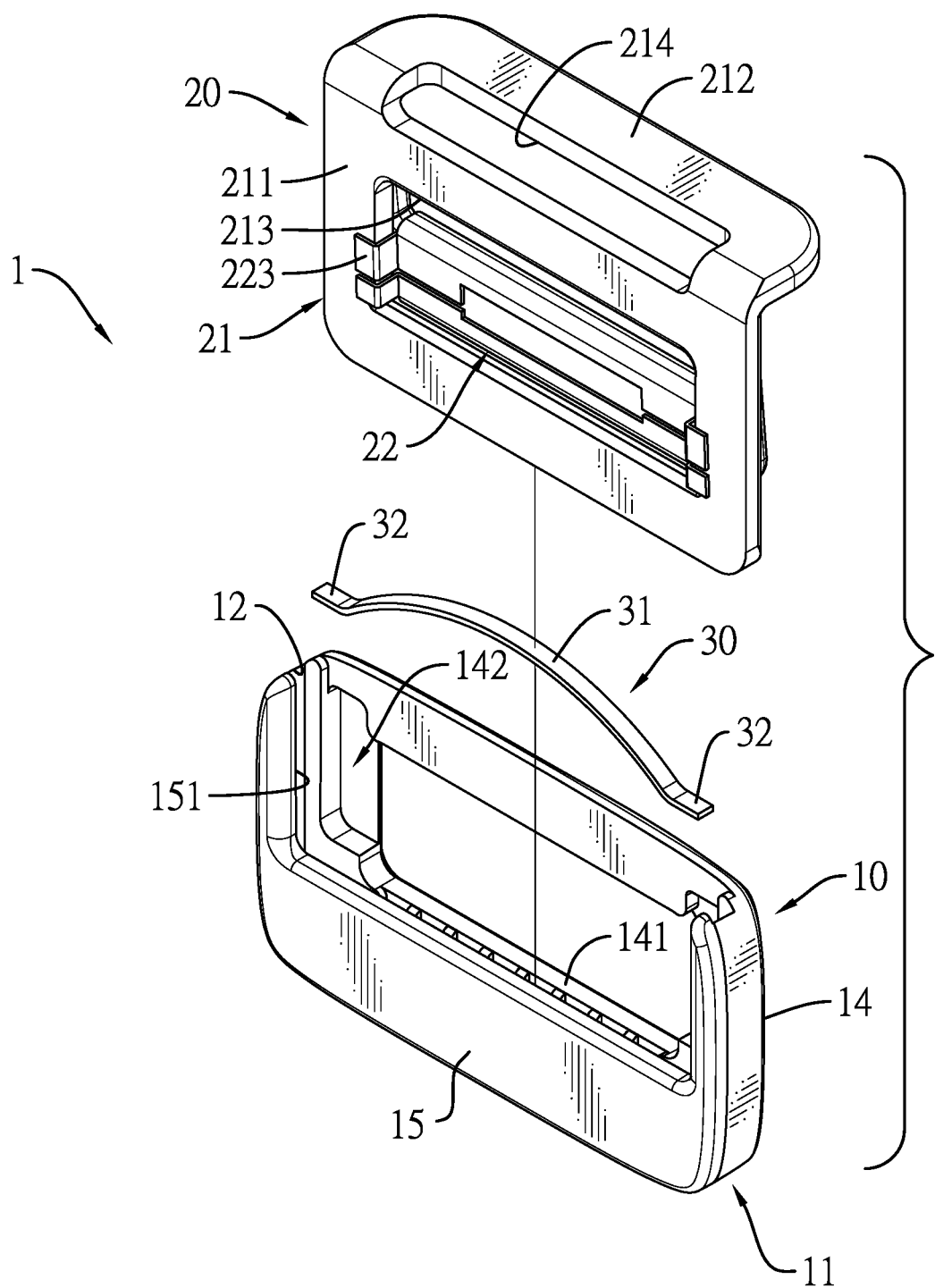
FIG. 5 is an exploded perspective view of the webbing length adjustment device in FIG. 1, showing an outer shell of the webbing length adjustment device is an integrated element.
Figure 6:
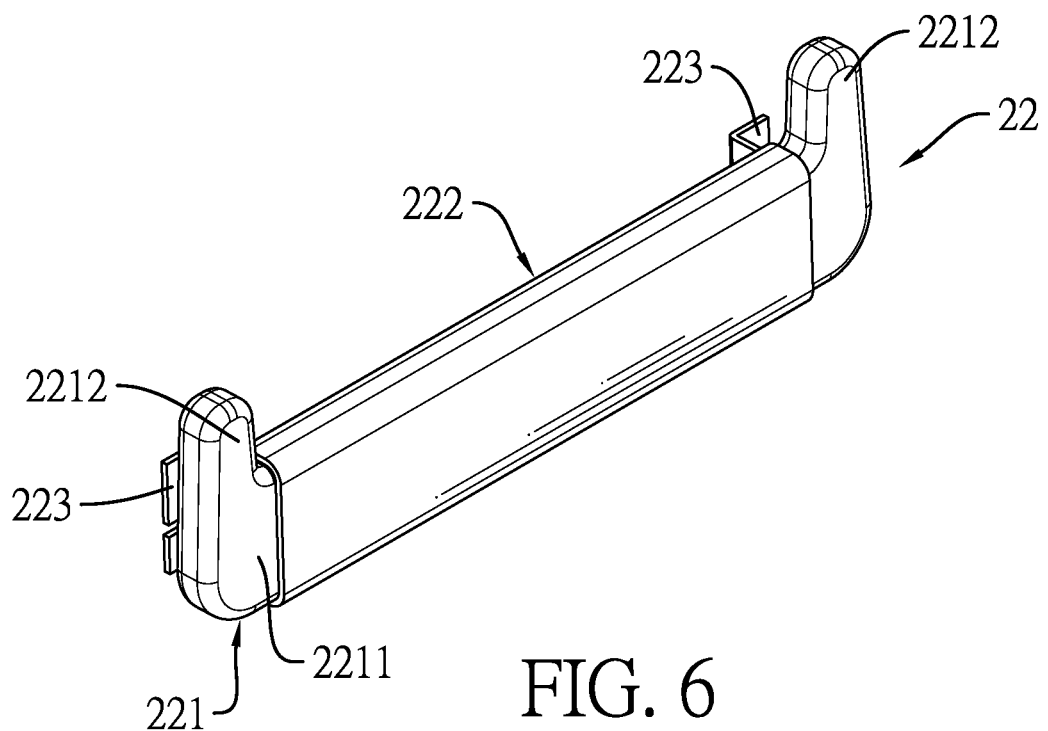
FIG. 6 is a perspective view of a sliding member of the webbing length adjustment device in FIG. 3.
Figure 7:
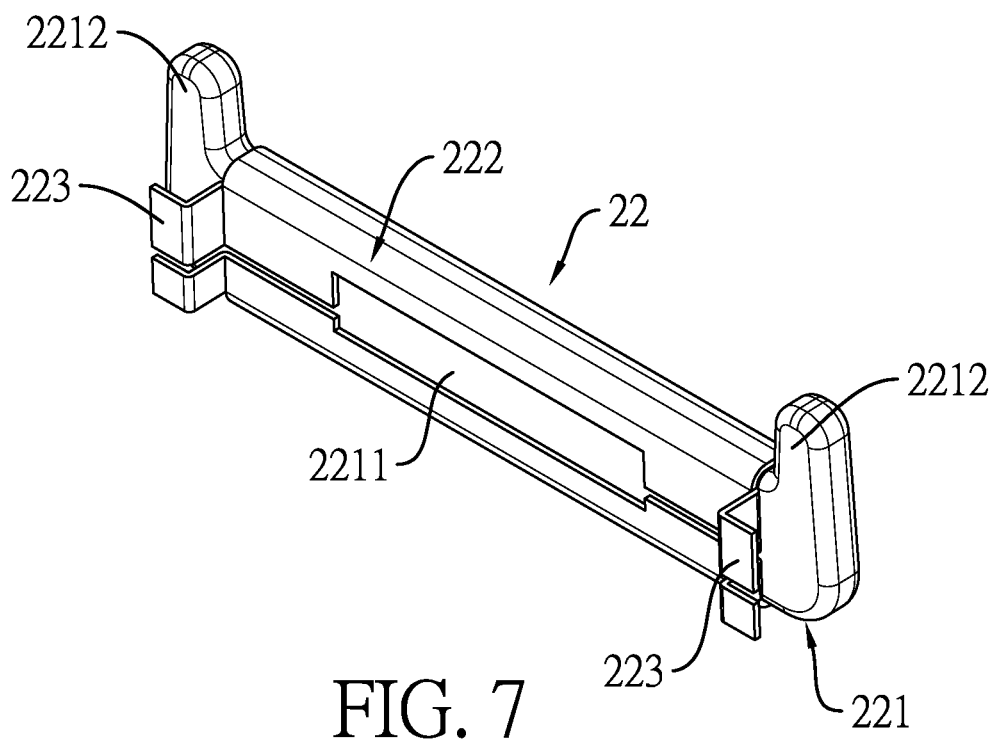
FIG. 7 is another perspective view of the sliding member of the webbing length adjustment device in FIG. 4.

With reference to FIGS. 4, 9, and 10, in the first embodiment and the second embodiment of the webbing length adjustment device 1, 1A, the operating member 21 of the adjustment assembly 20, 20A is an integrated and independent member and is made of rigid materials, such as metal. The operating member 21 has a longitudinal plate portion 211 and a lateral pressing plate portion 212. The longitudinal plate portion 211 has a first through hole 213 and a second through hole 214. The first through hole 213 and the second through hole 214 are formed through the longitudinal plate portion 211. The second through hole 214 is located above the first through hole 213. The longitudinal plate portion 211 is moveably disposed in the longitudinal groove 12 of the outer shell 10 and protrudes out of a top surface of the outer shell 10. The operating member 21 can longitudinally move relative to the outer shell 10.

The lateral pressing plate portion 212 is formed on a top end of the longitudinal plate portion 211, is bent and extends laterally, and is located beside the first through hole 213 and the second through hole 214. The lateral pressing plate portion 212 is located above the first side plate 14 of the outer shell 10. The second through hole 214 is formed on a connecting portion between the longitudinal plate portion 211 and the lateral pressing plate portion 212. The outer shell 10B has a lateral protrusion 16. The lateral protrusion 16 is formed on a bottom end of the first side plate 14B of the wall 11B and is located below the lateral pressing plate portion 212B.

Figure 11:
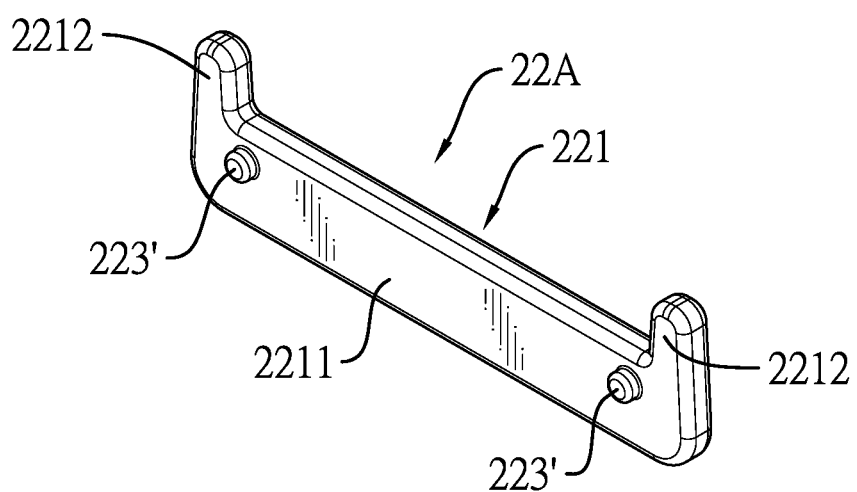
FIG. 11 is a perspective view of a sliding member of the webbing length adjustment device in FIG. 10.

With reference to FIGS. 3 to 7, and 9 showing the first embodiment of the webbing length adjustment device 1, and with reference to FIGS. 10 and 11 showing the second embodiment of the webbing length adjustment device 1A, the sliding member 22, 22A is disposed in the first through hole 213 of the operating member 21, is moveable relative to the operating member 21, and can longitudinally move relative to the outer shell 10. The sliding member 22, 22A has a sliding plate 221 and two sliding connecting portions 223, 223'. The sliding plate 221 is located at a side of the longitudinal plate portion 211 of the operating member 21, is located in the first connecting hole 141 of the first side plate 14 of the outer shell 10, is located below the lateral pressing plate portion 212, and has a side surface facing the operating member 21. The two sliding connecting portions 223, 223' are disposed on the side surface of the sliding plate 221 at a spaced interval and are inserted into the first through hole 213 of the operating member 21. The sliding member 22, 22A can longitudinally move in the longitudinal plate portion 211 of the operating member 21.

With reference to FIGS. 3 to 7, and 9 showing the first embodiment of the webbing length adjustment device 1, and with reference to FIGS. 10 and 11 showing the second embodiment of the webbing length adjustment device 1A, the sliding plate 221 of the sliding member 22, 22A has a base plate portion 2211 and two side plate portions 2212. The base plate portion 2211 is located in the first connecting hole 141 of the first side plate 14 and has two side ends. The two side plate portions 2212 are respectively formed on and upwardly protruded from the two side ends of the base plate portion 2211, and are respectively inserted into the two positioning grooves 142 of the first side plate 14 for limiting a longitudinal movement distance of the sliding member 22.

With reference to FIGS. 3 to 7, and 9 showing the first embodiment of the webbing length adjustment device 1, the sliding member 22 has a covering body 222. The covering body 222 is made of a bent metal slice or any rigid material, is wound around and fixed on the base plate portion 2211 of the sliding plate 221, and has two side ends. The two sliding connecting portions 223 are respectively formed on the two side ends of the covering body 222, are inserted through the first through hole 213 of the operating member 21, and extend to a side surface of the longitudinal plate portion 211 facing the second side plate 15. The sliding member 22 is moveable relative to the operating member 21.

With reference to FIGS. 10 and 11 showing the second embodiment of the webbing length adjustment device 1A, the two sliding connecting portions 223' are two protrusions, are formed on a side surface of the base plate portion 2211, and are inserted into the first through hole 213 of the operating member 21. The sliding member 22A is moveable relative to the operating member 21.

Figure 17:
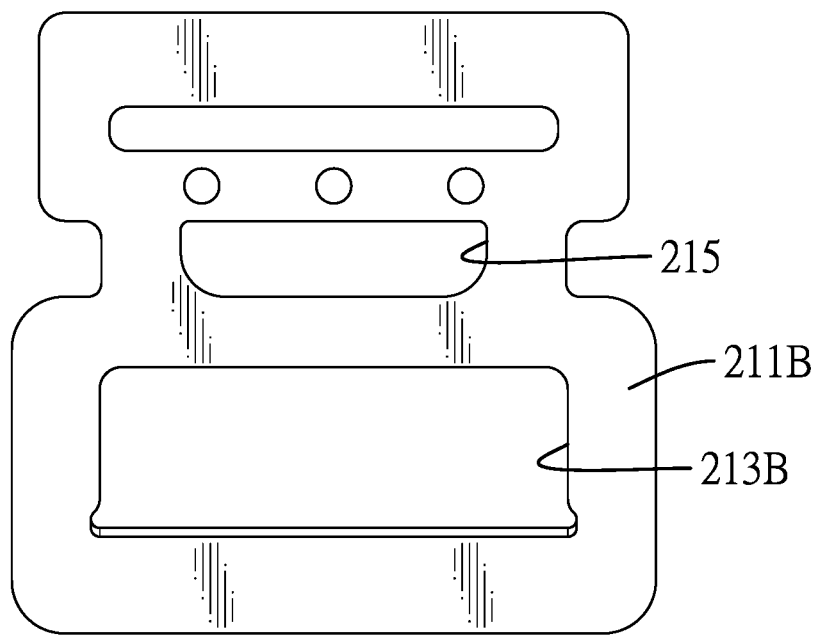
FIG. 17 is a front side view of a longitudinal plate portion of an operating member of the webbing length adjustment device in FIG. 16.

With reference to FIGS. 12 and 17 showing the third embodiment of the webbing length adjustment device 1B, the operating member 21B of the adjustment assembly 20B has the longitudinal plate portion 211B and a covering shell 210B. The longitudinal plate portion 211B is made of the rigid materials, such as metal. The longitudinal plate portion 211B is moveably disposed on the outer shell 10B and has a top section and a bottom section. The top section of the longitudinal plate portion 211B is disposed out of the top surface of the outer shell 10B. The bottom section of the longitudinal plate portion 211B is located below the top section of the longitudinal plate portion 211B and is moveably disposed in the longitudinal groove 12B of the outer shell 10B. The covering shell 210B is made of plastic materials. The covering shell 210B covers the top section of the longitudinal plate portion 211B.

The first through hole 213B is formed through the bottom section of the longitudinal plate portion 211B. The second through hole 214B is formed through the top section of the longitudinal plate portion 211B and the covering shell 210B. The lateral pressing plate portion 212B is formed on the covering shell 210B, is located beside the second through hole 214B, and is located above the first side plate 14B of the outer shell 10B. The lateral protrusion 16 is formed on and laterally protrudes out of the bottom end of the first side plate 14B of the wall 11B, and is located below the lateral pressing plate portion 212B.

With reference to FIGS. 12 to 15 showing the third embodiment of the webbing length adjustment device 1B, and with reference to FIGS. 1 to 7 showing the first embodiment of the webbing length adjustment device 1, the sliding members 22 in the first embodiment and the third embodiment of the webbing length adjustment device 1B are the same and can be replaced with the sliding member 22A in the second embodiment of the webbing length adjustment device 1A. The structure of the sliding member 22 in the third embodiment of the webbing length adjustment device 1B will not be described herein. The sliding member 22 is disposed in the first through hole 213B of the operating member 21B and is moveable relative to the operating member 21B.

With reference to FIGS. 12 to 17, in the third embodiment of the webbing length adjustment device 1B, the operating member 21B has a central hole 215. The central hole 215 is formed through the longitudinal plate portion 211B and is located between the first through hole 213B and the second through hole 214B. The outer shell 10B has a positioning protrusion 17. The positioning protrusion 17 is formed on the top surface of the outer shell 10B and passes through the central hole 215 for limiting a relative movement distance between the operating member 21B and the outer shell 10B.

With reference to FIGS. 3, 4, 8, 9, 14, 15, and 19, the elastic member 30 can be a spring or an elastic slice. The elastic member 30 is disposed in the longitudinal groove 12 of the outer shell 10, 10B, and is located between the bottom plate 13 and the longitudinal plate portion 211 of the operating member 21 for giving a restoring force to the operating member 21.

The elastic member 30 is the elastic slice and has an elastic base 31 and two end portions 32. The elastic base 31 is an upward arc and has two side ends and a middle section. The middle section is located between the side ends of the elastic base 31 and is connected to a middle of a bottom surface of the longitudinal plate portion 211, 211B of the operating member 21 for giving a restoring force to the operating member 21, 21B to move steadily.

With reference to FIG. 4, in the first embodiment of the webbing length adjustment device 1, the bottom plate 13 of the outer shell 10 has the concave portion 131 and the two receiving portions 132 respectively formed on two side ends of the concave portion 131. The two end portions 32 of the elastic member 30 respectively abut against the two receiving portions 132 of the bottom plate 13.

Figure 2:
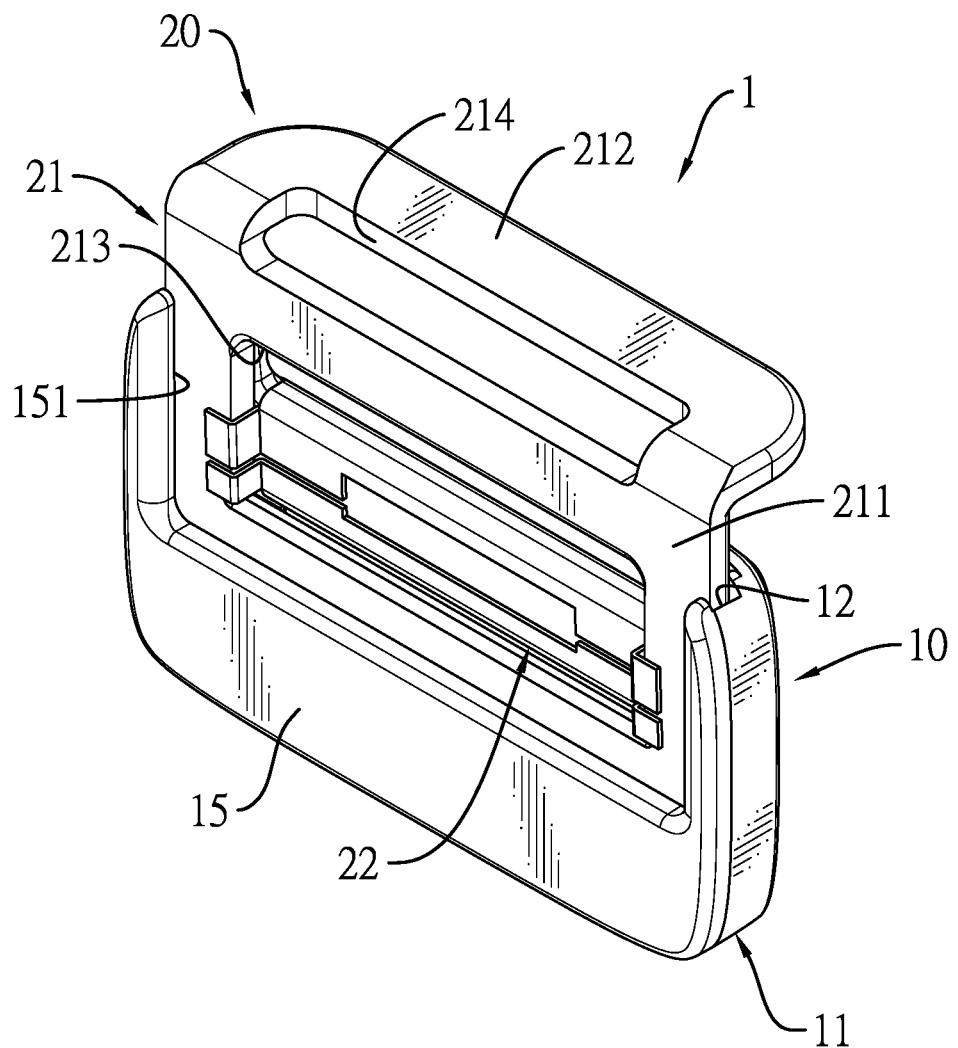
FIG. 2 is another perspective view of the webbing length adjustment device in FIG. 1.
Figure 3:
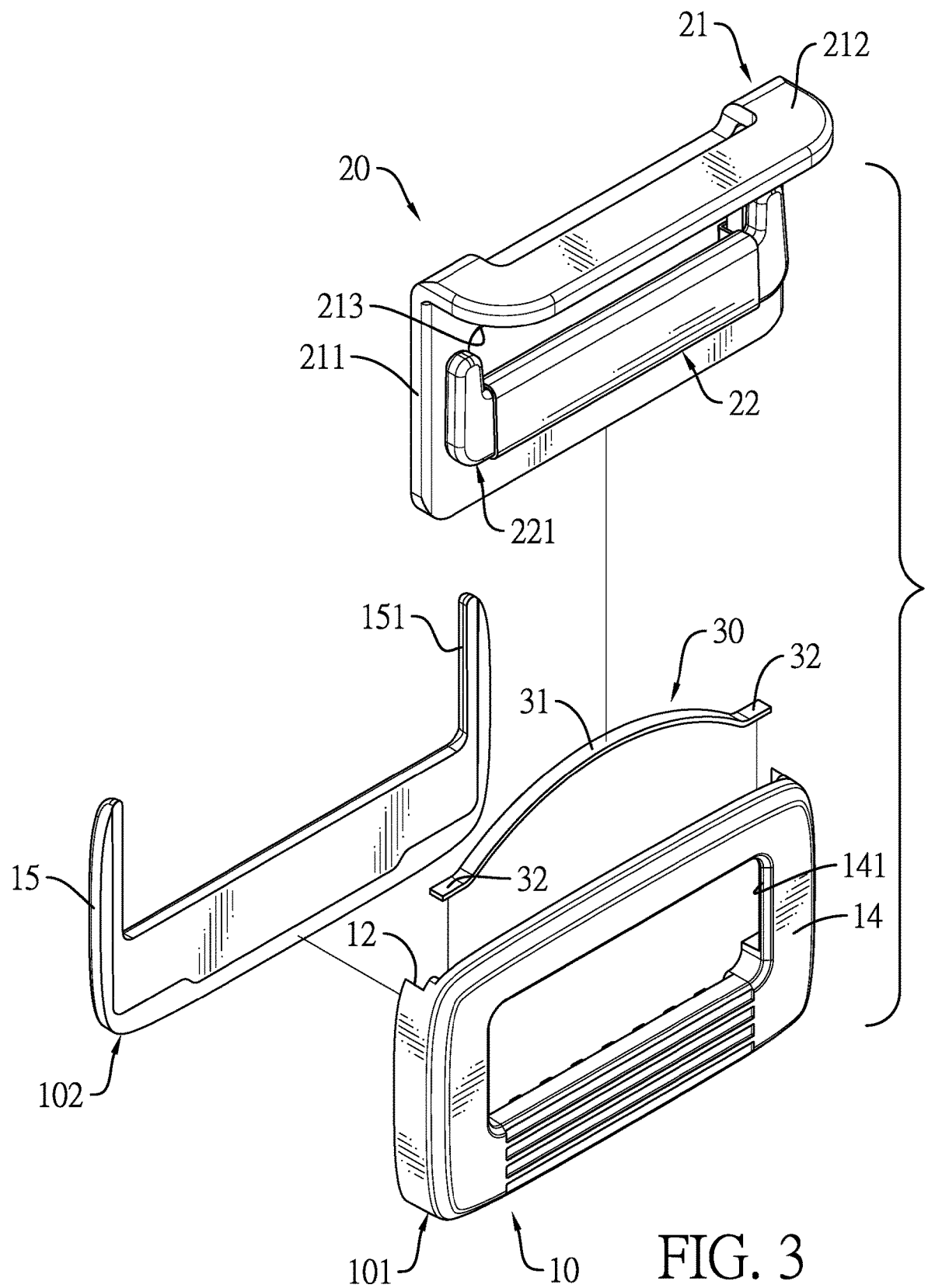
FIG. 3 is an exploded perspective view of the webbing length adjustment device in FIG. 1.
Figure 18:
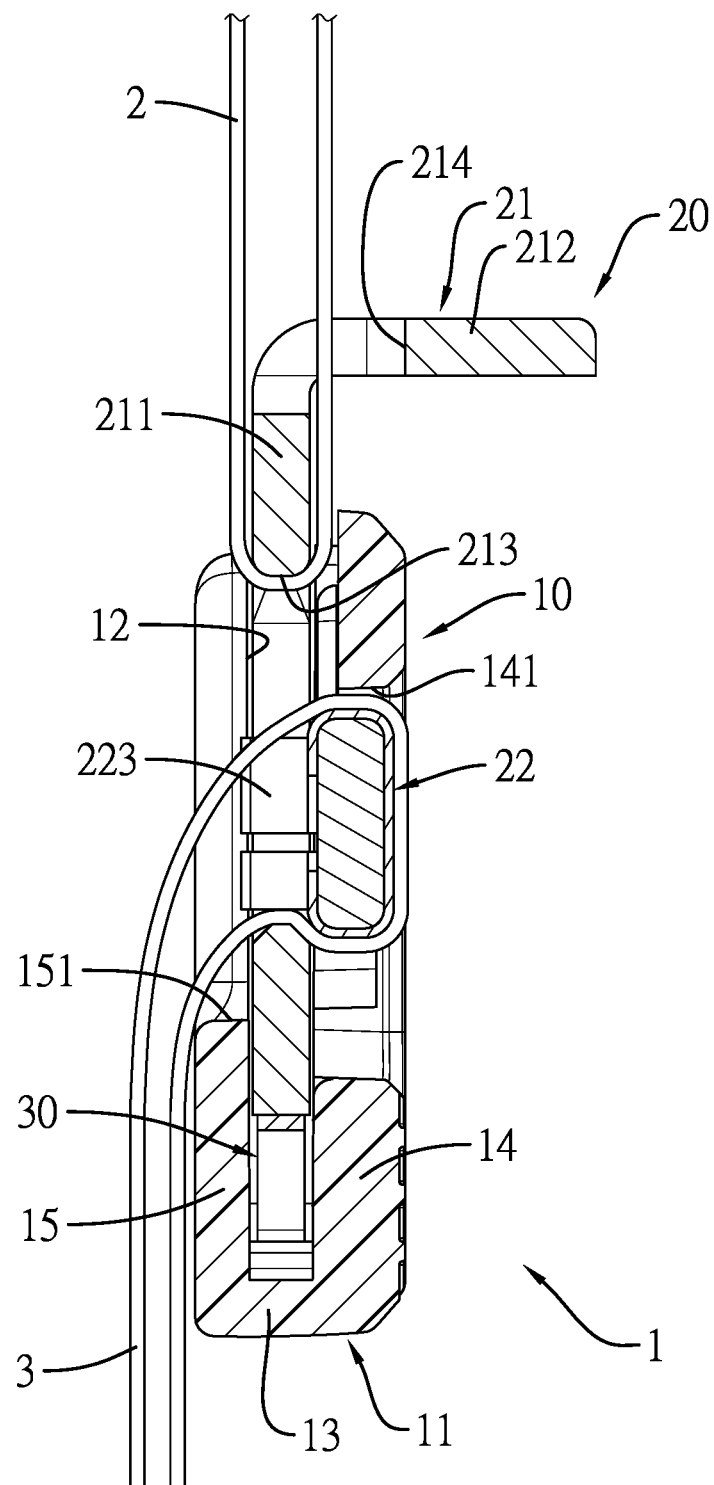
FIG. 18 is an operational side view in partial section of the first embodiment of the webbing length adjustment device in FIGS. 1 to 4, showing a first webbing and a second webbing are passed through the webbing length adjustment device.

In use, with reference to FIGS. 1, 2, and 18, the first embodiment of the webbing length adjustment device 1 is applied to a seat belt system. A first webbing 2 of the seat belt system passes through the first through hole 213 and the second through hole 214 of the operating member 12 of the adjustment assembly 20. The first webbing 2 is connected to the operating member 21. A second webbing 3 of the seat belt system passes through the second connecting hole 151 of the second side plate 15 from the outside of the second side plate 15, passes through the first through hole 213 of the operating member 21, passes through the first connecting hole 141 of the first side plate 14 between a bottom of the sliding member 22 and the first side plate 14, curls around the sliding member 22 and returns from the first through hole 213 of the operating member 21, and passes out of the second connecting hole 151 of the second side plate 15 in sequence. The second webbing 3 is wound around the sliding member 22. The elastic member 30 gives the restoring force to the operating member 21 for pushing the operating member of the adjustment assembly 20 upwardly. The operating member 21 and the sliding member 22 retained in the outer shell 10 relatively clip the second webbing 3 to fix the second webbing 3.

Figure 13:
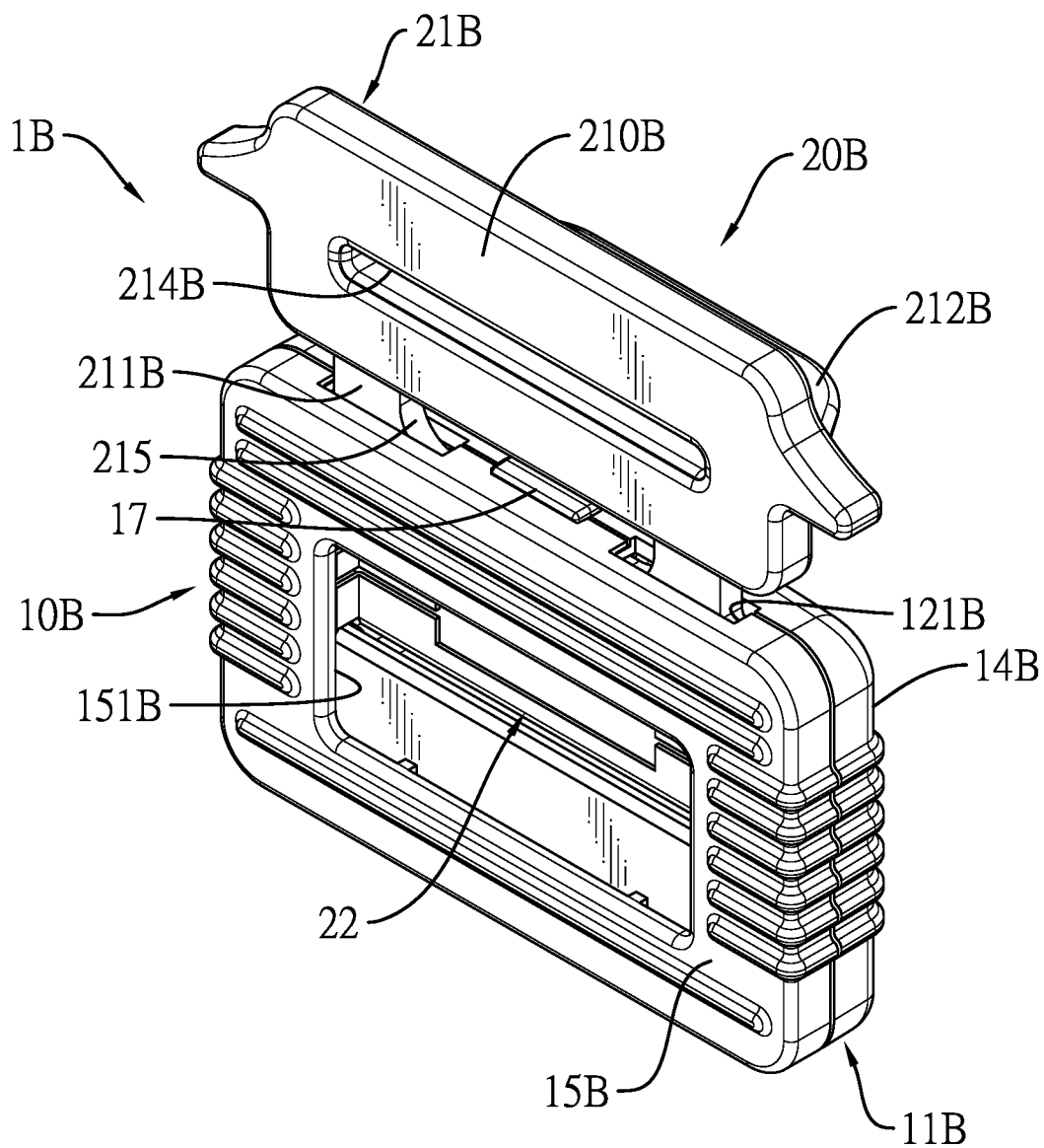
FIG. 13 is another perspective view of the webbing length adjustment device in FIG. 12.
Figure 19:
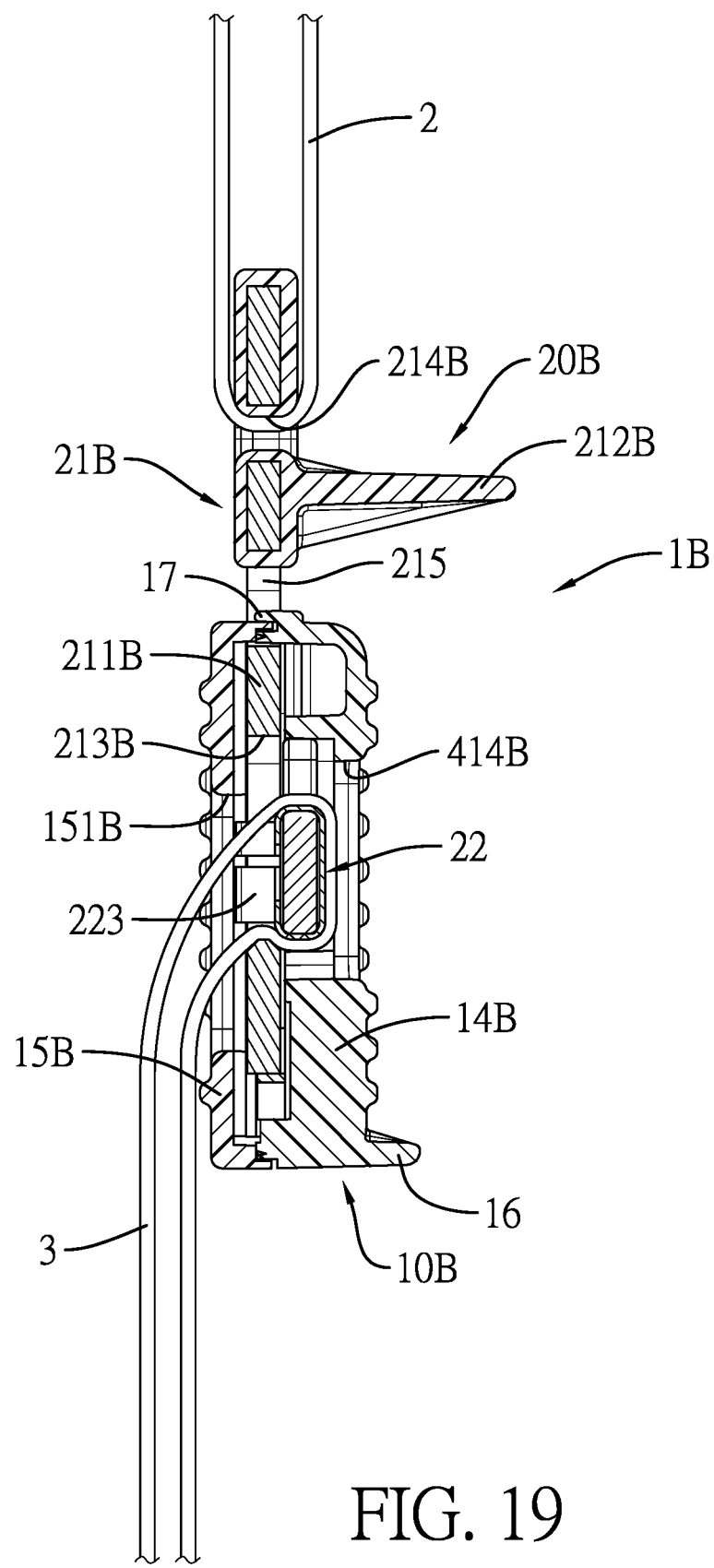
FIG. 19 is an operational side view in partial section of the third embodiment of the webbing length adjustment device in FIGS. 12 to 15, showing a first webbing and a second webbing are passed through the webbing length adjustment device.

In use, with reference to FIGS. 12, 13, and 19, the third embodiment of the webbing length adjustment device 1B is applied to a seat belt system. The first webbing 2 of the seat belt system passes through the second through hole 214B of the operating member 21B and is connected to a top section of the operating member 21B. The second webbing 3 of the seat belt system passes through the second connecting hole 151B of the second side plate 15B from the outside of the second side plate 15B, passes through the first through hole 213B of the operating member 21B between the bottom of the sliding member 22 and the first side plate 14B, curls around the sliding member 22 and returns from the first through hole 213B of the operating member 21B, and passes out of the second connecting hole 151B of the second side plate 15B in sequence. The second webbing 3 is wound around the sliding member 22. The elastic member 30 gives the restoring force to the operating member 21B for pushing the operating member of the adjustment assembly 20B upwardly. The operating member 21B and the sliding member 22 retained in the outer shell 10B relatively clip the second webbing 3 to fix the second webbing 3.

With reference to FIGS. 18 and 19, the second webbing 3 is fixed by the webbing length adjustment device 1, 1B. The user can pull one free end of the second webbing 3 by a single hand without holding the operating member 21, 21B to tighten the seat belt system. The operating member 21, 21B and the sliding member 22 retained in the outer shell 10, 10B relatively clip the second webbing 3 to fix the second webbing 3 by the tension of the second webbing 3, friction generated between the second webbing 3 and the operating member 21, 21B, and friction generated between the second webbing 3 and the sliding member 22.

Figure 20:
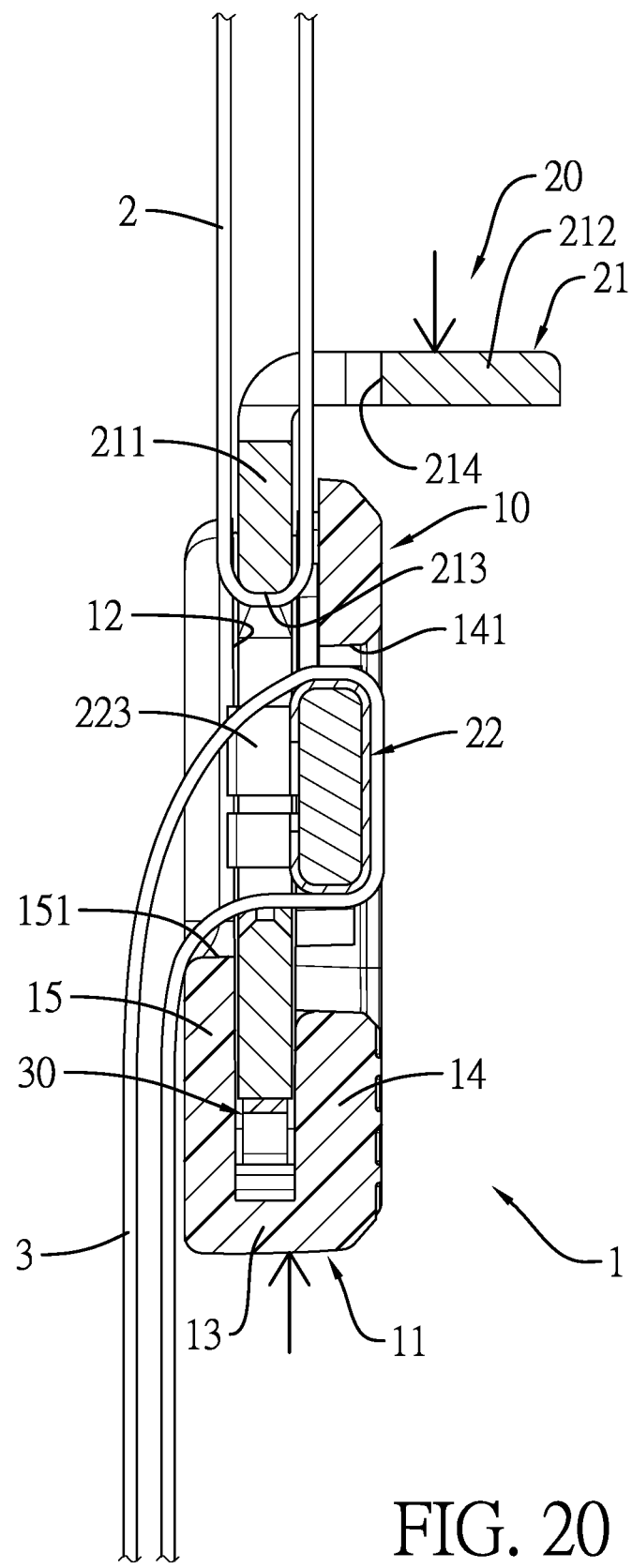
FIG. 20 is an operational side view in partial section of the first embodiment of the webbing length adjustment device in FIG. 18, showing the operating member moves relative to a sliding member of the webbing length adjustment device.
Figure 21:
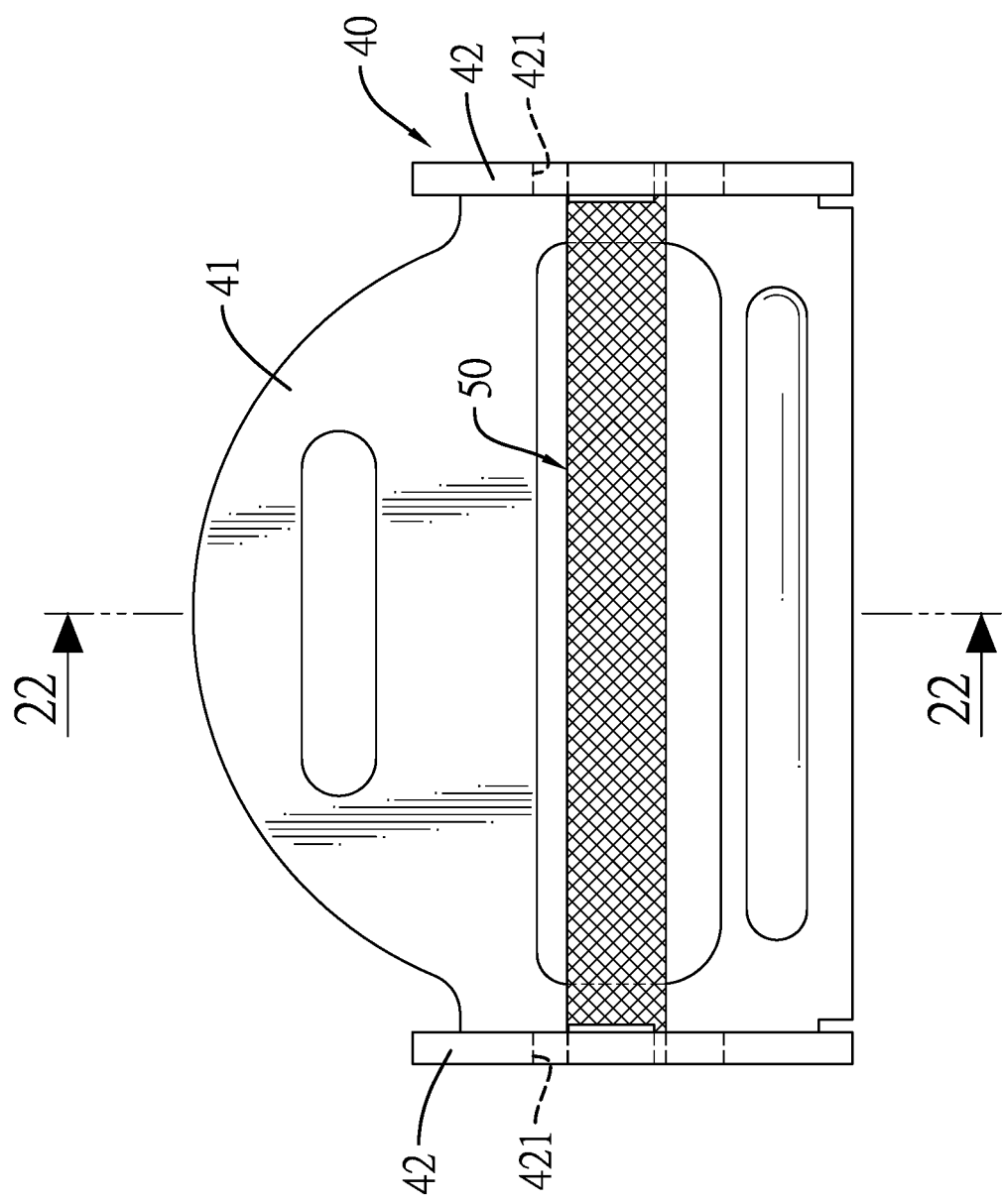
FIG. 21 is a front side view of a first conventional webbing length adjustment device in accordance with the prior art.
Figure 22:
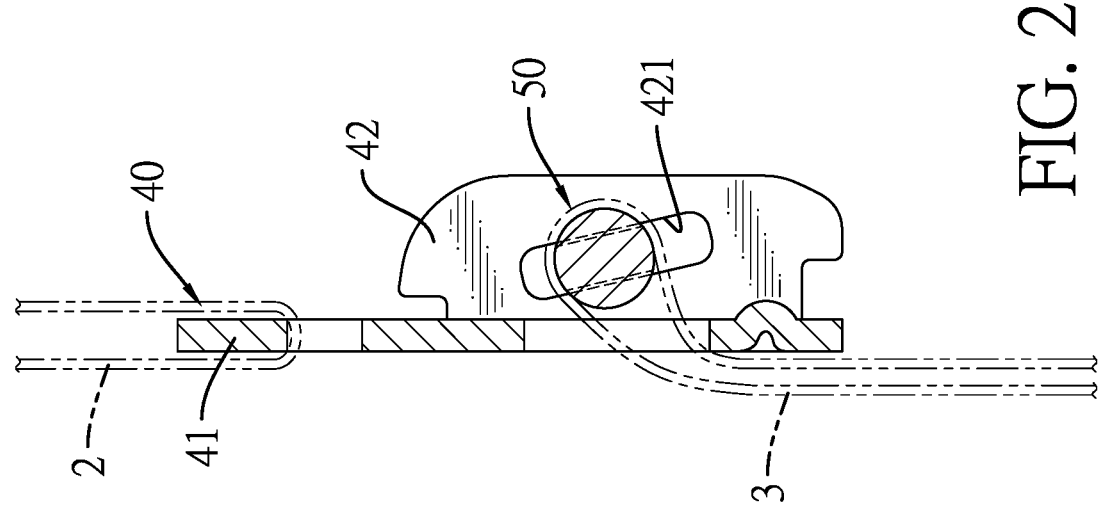
FIG. 22 is an operational side view in partial section of the first conventional webbing length adjustment device along line 22-22 in FIG. 21.
Figure 25:
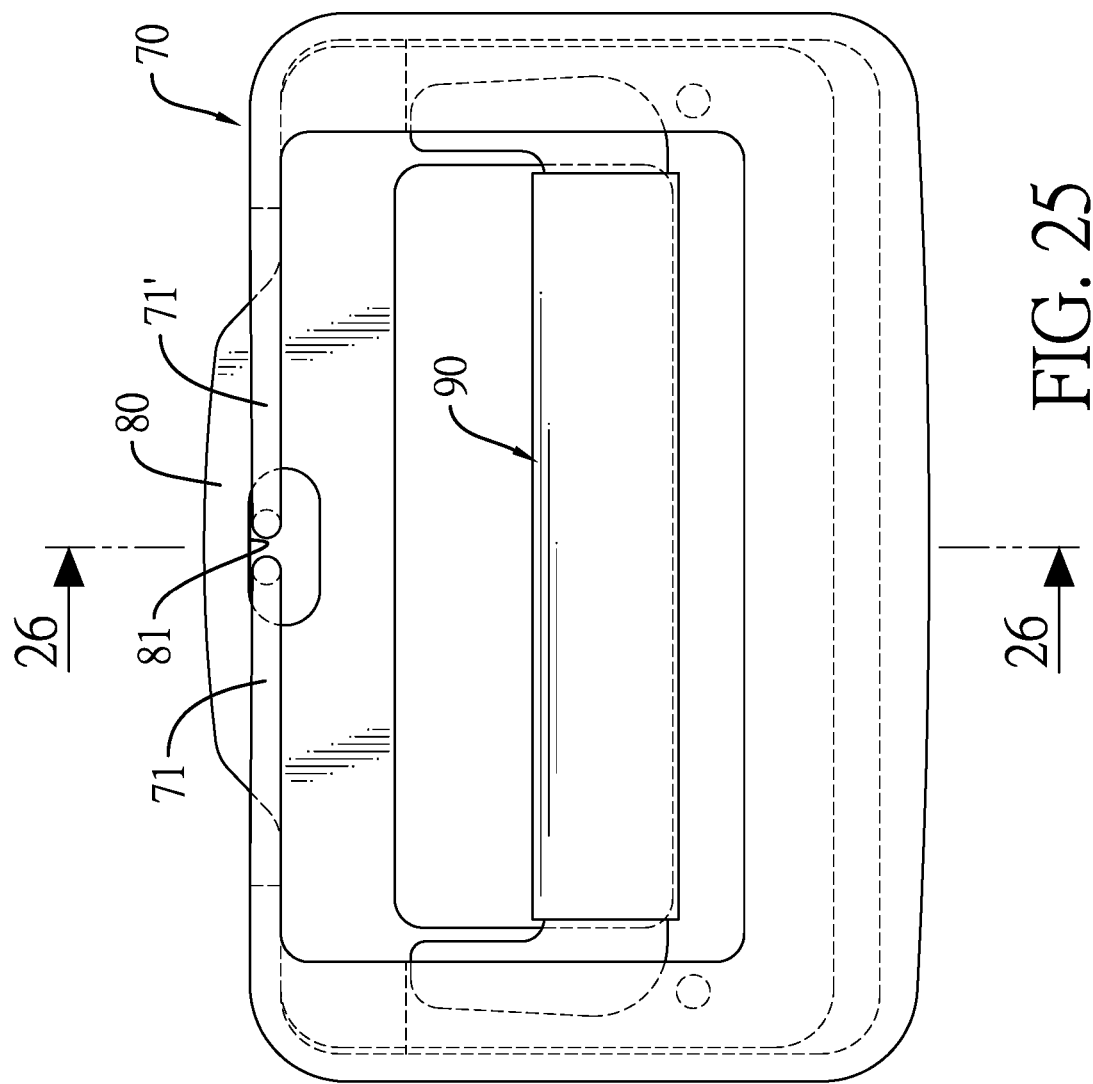
FIG. 25 is a front side view of a third conventional webbing length adjustment device in accordance with the prior art.
Figure 26:
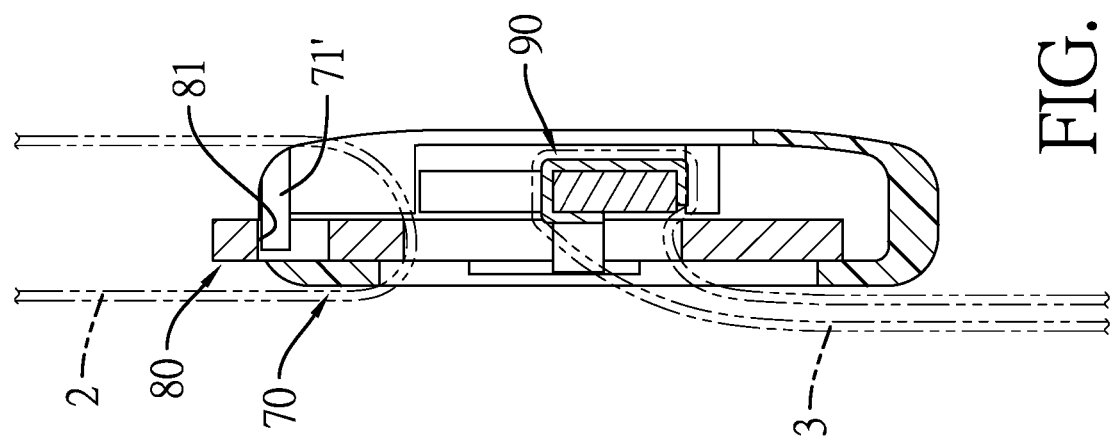
FIG. 26 is an operational side view in partial section of the third conventional webbing length adjustment device along line 26-26 in FIG. 25.

For adjusting the length of the second webbing 3, with reference to FIG. 20 showing the first embodiment of the webbing length adjustment device 1, the user holds the operating member 21 by the hand and presses the lateral pressing plate portion 212 and the bottom portion of the outer shell 10. The lateral pressing plate portion 212 gives points of application for pressing easily. The operating member 21 moves relative to the sliding member 22. The elastic member 30 located between the operating member 21 and the bottom plate 13 of the outer shell 10 is forced to generate an elastic deformation. The second webbing 3 is loosened by the operating member 21 and the sliding member 22. The hand keeps pressing lateral pressing plate portion 212 and the bottom of the outer shell 10 to carry the webbing length adjustment device 1 to the desired position. Then, the hand is released, and the elastic member 30 gives the restoring force to the operating member 21. The operating member 21 and the sliding member 22 relatively clip the second webbing 3 for fixing the second webbing 3. The second webbing 3 is fixed by the webbing length adjustment device 1 again.

Accordingly, the operating member 21, 21B is disposed in the outer shell 10, 10B. The lateral pressing plate portion 212, 212B is formed on the top end of the operating member 21, 21B and is bent laterally. In use, the lateral pressing plate portion 212, 212B of the operating member 21, 21B and the bottom portion of the outer shell 10, 10B can be held and pressed by the single hand of the user for loosening the second webbing 3. The lateral pressing plate portion 212, 212B of the operating member 21, 21B gives more areas for gripping and gives the points of application for pressing easily and operating conveniently. After the operating member 21, 21B is connected to the first webbing 2, the lateral pressing plate portion 212, 212B is located at an outer side of the first webbing 2 and gives good points of application for pressing easily. When the lateral pressing plate portion 212, 212B of the operating member 21, 21B is pressed by the user and moves relative to the outer shell 10, 10B, there is no interference between the first webbing 2 and user's hand. Furthermore, the webbing length adjustment device 1, 1A, 1B provides the outer shell 10, 10B for disposing, protecting, and gripping the adjustment assembly 20, 20A, 20B. The elastic member 30 is an independent member and is disposed in the outer shell 10, 10B for giving the restoring force to the operating member 21, 21B of the adjustment assembly 20, 20A, 20B. Therefore, the outer shell 10, 10B is hard to damage.

What is claimed is:

1. A webbing length adjustment device applied to be connected to a first webbing and a second webbing of a seat belt system, and the webbing length adjustment device comprising:
    an outer shell having
        a wall having
            a first side plate having a first connecting hole formed through the first side plate;
            a second side plate being laterally opposite to the first side plate at a spaced interval and having a second connecting hole formed through the second side plate; and
            a bottom plate disposed between and connected with the first side plate and the second side plate; and
        a longitudinal groove formed in the wall, located between the first side plate and the second side plate, located above the bottom plate, communicating with the first connecting hole of the first side plate and the second connecting hole of the second side plate, and having at least one upward opening formed on the wall;
    an adjustment assembly disposed in the outer shell and having
        an operating member moveably disposed in the longitudinal groove of the outer shell, and having
            a first through hole formed through the operating member and located in the longitudinal groove of the outer shell;
            a second through hole formed through the operating member and located above the first through hole, wherein the first webbing is inserted through the first through hole and the second through hole of the operating member for being connected to the operating member; and
            a lateral pressing plate portion formed on the operating member, located above the outer shell, and located beside the second through hole, wherein the lateral pressing plate portion is located at an outer side of the first webbing; and
        a sliding member disposed in the first through hole of the operating member, wherein the operating member and the sliding member are disposed in the outer shell and move relative to each other, wherein the second webbing passes through the first through hole of the operating member from an outer side of the outer shell, curls around the sliding member and returns from the first through hole, and passes out the outer shell, the second webbing is locked or unlocked by a relative motion between the operating member and the sliding member; and
    an elastic member disposed in the longitudinal groove of the outer shell, and located between the bottom plate and the operating member.

2. The webbing length adjustment device as claimed in claim 1, wherein the sliding member has
    a sliding plate located at a side of the operating member, located in the first connecting hole of the first side plate of the outer shell, and having a side surface facing the operating member; and
    two sliding connecting portions disposed on the side surface of the sliding plate at a spaced interval and inserted into the first through hole of the operating member.

3. The webbing length adjustment device as claimed in claim 2, wherein
    the first side plate has
        an inner side surface facing the longitudinal groove; and
        two positioning grooves formed on the inner side surface of the first side plate and oppositely located beside the first connecting hole; and
    the sliding plate of the sliding member has
        a base plate portion located in the first connecting hole of the first side plate and having two side ends; and
        two side plate portions respectively formed on and upwardly protruded from the two side ends of the base plate portion, and respectively inserted into the two positioning grooves of the first side plate for limiting a longitudinal movement distance of the sliding member.

4. The webbing length adjustment device as claimed in claim 3, wherein the sliding member has
    a covering body wound around and fixed on the base plate portion of the sliding plate, and having
        two side ends; and
        the two sliding connecting portions respectively formed on the two side ends of the covering body, and inserted through the first through hole of the operating member.

5. The webbing length adjustment device as claimed in claim 3, wherein the two sliding connecting portions are two protrusions, are formed on a side surface of the base plate portion, and are inserted into the first through hole of the operating member.

6. The webbing length adjustment device as claimed in claim 3, wherein the outer shell has a lateral protrusion formed on a bottom end of the first side plate of the wall and located below the lateral pressing plate portion.

7. The webbing length adjustment device as claimed in claim 3, wherein the elastic member is an elastic slice, is disposed in the longitudinal groove of the outer shell, and has
    an elastic base being an upward arc, and having
        two side ends; and
        a middle section located between the two side ends of the elastic base and connected to a middle of a bottom surface of the operating member; and
    two end portions respectively formed on the two side ends of the elastic base and abutting against the bottom plate.

8. The webbing length adjustment device as claimed in claim 3, wherein
    the operating member has a longitudinal plate portion moveably disposed in the longitudinal groove of the outer shell and having a top end;
    the lateral pressing plate portion is integrated into the top end of the longitudinal plate portion and bends laterally;
    the first through hole is formed through the longitudinal plate portion; and
    the second through hole is formed through the longitudinal plate portion adjacent to the lateral pressing plate portion.

9. The webbing length adjustment device as claimed in claim 3, wherein the operating member has
- a longitudinal plate portion moveably disposed on the outer shell and having
  - a top section disposed out of the outer shell; and
  - a bottom section moveably located below the top section of the longitudinal plate portion and disposed in the longitudinal groove of the outer shell;
- a covering shell covering the top section of the longitudinal plate portion and located above the outer shell;
- the first through hole formed through the bottom section of the longitudinal plate portion;
- the second through hole formed through the top section of the longitudinal plate portion and the covering shell; and
- the lateral pressing plate portion formed on the covering shell.

10. The webbing length adjustment device as claimed in claim 2, wherein the outer shell has a lateral protrusion formed on a bottom end of the first side plate of the wall and located below the lateral pressing plate portion.

11. The webbing length adjustment device as claimed in claim 2, wherein the elastic member is an elastic slice, is disposed in the longitudinal groove of the outer shell, and has
- an elastic base being an upward arc, and having
  - two side ends; and
  - a middle section located between the two side ends of the elastic base and connected to a middle of a bottom surface of the operating member; and
  - two end portions respectively formed on the two side ends of the elastic base and abutting against the bottom plate.

12. The webbing length adjustment device as claimed in claim 2, wherein
- the operating member has a longitudinal plate portion moveably disposed in the longitudinal groove of the outer shell and having a top end;
- the lateral pressing plate portion is integrated into the top end of the longitudinal plate portion and bends laterally;
- the first through hole is formed through the longitudinal plate portion; and
- the second through hole is formed through the longitudinal plate portion adjacent to the lateral pressing plate portion.

13. The webbing length adjustment device as claimed in claim 12, wherein the wall has a lateral protrusion formed on a bottom end of the first side plate of the wall and located below the lateral pressing plate portion.

14. The webbing length adjustment device as claimed in claim 12, wherein the second connecting hole of the second side plate is formed from a top end of the second side plate and extends longitudinally.

15. The webbing length adjustment device as claimed in claim 12, wherein the elastic member is an elastic slice, is disposed in the longitudinal groove of the outer shell, and has
- an elastic base being an upward arc, and having
  - two side ends; and
  - a middle section located between the two side ends of the elastic base and connected to a middle of a bottom surface of the operating member; and
- two end portions respectively formed on the two side ends of the elastic base and abutting against the bottom plate.

16. The webbing length adjustment device as claimed in claim 2, wherein the operating member has
- a longitudinal plate portion moveably disposed on the outer shell and having
  - a top section disposed out of the outer shell; and
  - a bottom section moveably located below the top section of the longitudinal plate portion and disposed in the longitudinal groove of the outer shell;
- a covering shell covering the top section of the longitudinal plate portion and located above the outer shell;
- the first through hole formed through the bottom section of the longitudinal plate portion;
- the second through hole formed through the top section of the longitudinal plate portion and the covering shell; and
- the lateral pressing plate portion formed on the covering shell.

17. The webbing length adjustment device as claimed in claim 16, wherein the wall has a lateral protrusion formed on a bottom end of the first side plate of the wall and located below the lateral pressing plate portion.

18. The webbing length adjustment device as claimed in claim 16, wherein the elastic member is an elastic slice, is disposed in the longitudinal groove of the outer shell, and has
- an elastic base being an upward arc, and having
  - two side ends; and
  - a middle section located between the two side ends of the elastic base and connected to a middle of a bottom surface of the operating member; and
- two end portions respectively formed on the two side ends of the elastic base and abutting against the bottom plate.

19. The webbing length adjustment device as claimed in claim 1, wherein the outer shell has a lateral protrusion formed on a bottom end of the first side plate of the wall and is located below the lateral pressing plate portion.

20. The webbing length adjustment device as claimed in claim 1, wherein the elastic member is an elastic slice, is disposed in the longitudinal groove of the outer shell, and has
- an elastic base being an upward arc, and having
  - two side ends; and
  - a middle section located between the two side ends of the elastic base and connected to a middle of a bottom surface of the operating member; and
- two end portions respectively formed on the two side ends of the elastic base and abutting against the bottom plate.

21. The webbing length adjustment device as claimed in claim 1, wherein
- the operating member has a longitudinal plate portion moveably disposed in the longitudinal groove of the outer shell and having a top end;
- the lateral pressing plate portion is integrated into the top end of the longitudinal plate portion and bends laterally;
- the first through hole is formed through the longitudinal plate portion; and
- the second through hole is formed through the longitudinal plate portion adjacent to the lateral pressing plate portion.

22. The webbing length adjustment device as claimed in claim 21, wherein the wall has a lateral protrusion formed on a bottom end of the first side plate of the wall and located below the lateral pressing plate portion.

23. The webbing length adjustment device as claimed in claim 21, wherein the second connecting hole of the second side plate is formed from a top end of the second side plate and extends longitudinally.

24. The webbing length adjustment device as claimed in claim 21, wherein the elastic member is an elastic slice, is disposed in the longitudinal groove of the outer shell, and has
    an elastic base being an upward arc, and having
        two side ends; and
        a middle section located between the two side ends of the elastic base and connected to a middle of a bottom surface of the operating member; and
    two end portions respectively formed on the two side ends of the elastic base and abutting against the bottom plate.

25. The webbing length adjustment device as claimed in claim 1, wherein the operating member has
    a longitudinal plate portion moveably disposed on the outer shell and having
        a top section disposed out of the outer shell; and
        a bottom section moveably located below the top section of the longitudinal plate portion and disposed in the longitudinal groove of the outer shell;
    a covering shell covering the top section of the longitudinal plate portion and located above the outer shell;
    the first through hole formed through the bottom section of the longitudinal plate portion;
    the second through hole formed through the top section of the longitudinal plate portion and the covering shell; and
    the lateral pressing plate portion formed on the covering shell.

26. The webbing length adjustment device as claimed in claim 25, wherein the wall has a lateral protrusion formed on a bottom end of the first side plate of the wall and located below the lateral pressing plate portion.

27. The webbing length adjustment device as claimed in claim 25, wherein the elastic member is an elastic slice, is disposed in the longitudinal groove of the outer shell, and has
    an elastic base being an upward arc, and having
        two side ends; and
        a middle section located between the two side ends of the elastic base and connected to a middle of a bottom surface of the operating member; and
    two end portions respectively formed on the two side ends of the elastic base and abutting against the bottom plate.

\* \* \* \* \*